(12) United States Patent
Van Hoff et al.

(10) Patent No.: US 10,205,930 B2
(45) Date of Patent: Feb. 12, 2019

(54) CAMERA ALLAY INCLUDING CAMERA MODULES WITH HEAT SINKS

(71) Applicant: Jaunt Inc., Palo Alto, CA (US)

(72) Inventors: Arthur Van Hoff, Palo Alto, CA (US);
Thomas M. Annau, Palo Alto, CA (US); Jens Christensen, Palo Alto, CA (US); Koji Gardiner, Palo Alto, CA (US); Punit Govenji, Palo Alto, CA (US); James Dunn, Palo Alto, CA (US)

( * ) Notice: Subject to any disclaimer, the term of this patent is extended or adjusted under 35 U.S.C. 154(b) by 75 days.

(21) Appl. No.: 15/266,871

(22) Filed: Sep. 15, 2016

(65) Prior Publication Data

US 2017/0078647 A1 Mar. 16, 2017

Related U.S. Application Data

(60) Provisional application No. 62/219,002, filed on Sep. 15, 2015.

(51) Int. Cl.
| | |
|---|---|
| *H04N 5/225* | (2006.01) |
| *H04N 5/232* | (2006.01) |
| *H04N 5/247* | (2006.01) |
| *H04N 13/243* | (2018.01) |
| *H04N 13/189* | (2018.01) |

(Continued)

(52) U.S. Cl.
CPC ......... *H04N 13/243* (2018.05); *H04N 5/2251* (2013.01); *H04N 5/2252* (2013.01); *H04N 5/2253* (2013.01); *H04N 5/2254* (2013.01); *H04N 5/2257* (2013.01); *H04N 5/23203* (2013.01); *H04N 5/23238* (2013.01); *H04N 5/247* (2013.01); *H04N 13/189* (2018.05);

(Continued)

(58) Field of Classification Search
CPC .... H04N 5/225; H04N 5/2252; H04N 5/2253; H04N 5/2254; H04N 5/2257; H04N 5/23257; H04N 5/23203; H04N 5/23238; H04N 5/247; H04N 13/0271; H04N 13/0296; H05K 7/20; H01L 2023/4037
USPC .................. 348/244, 373–376; 396/97, 231; 250/238, 239, 443, 339.03, 352, 370.15, 250/675, 706, 718, 720, 796, 773.1, 250/339.04, 346; 257/675, 706, 717, 718, 257/720, 796.276

See application file for complete search history.

(56) References Cited

U.S. PATENT DOCUMENTS 9,363,569 B1 * 6/2016 van Hoff ............ G06Q 30/0263
9,451,162 B2 * 9/2016 Van Hoff ................ G11B 27/11

(Continued)

*Primary Examiner* — Marly Camargo
(74) *Attorney, Agent, or Firm* — Burbage Law, P.C.; Jon-Michael Burbage; Elizabeth Ruzich

(57) ABSTRACT

A camera system is configured to capture video content with 360 degree views of an environment. The camera array comprises a housing including a first quadrant, a second quadrant, a third quadrant, and a fourth quadrant, wherein each of the first quadrant, the second quadrant, the third quadrant, and the fourth quadrant form a plurality of apertures, a chassis bottom that is removably coupled to the housing, and a plurality of camera modules, each camera module comprising a processor, a memory, a sensor, and a lens, wherein each of the camera modules is removably coupled to one of the plurality of apertures in the housing, wherein the first quadrant, the second quadrant, the third quadrant, and the fourth quadrant each include a subset of the plurality of camera modules. Each of the plurality of camera modules includes a heat sink.

20 Claims, 34 Drawing Sheets

(51) Int. Cl.
*H04N 13/296* (2018.01)
*H04N 13/271* (2018.01)

(52) U.S. Cl.
CPC ......... *H04N 13/271* (2018.05); *H04N 13/296* (2018.05); *H04N 2213/001* (2013.01)

(56) References Cited

U.S. PATENT DOCUMENTS

| | | | |
|---|---|---|---|
| 9,451,727 B2 * | 9/2016 | Tolbert | H05K 1/0209 |
| 9,851,793 B1 * | 12/2017 | van Hoff | G06Q 30/0263 |
| 9,911,454 B2 * | 3/2018 | van Hoff | G11B 19/20 |
| 2009/0073256 A1 * | 3/2009 | Steuart, III | G03B 35/08 |
| | | | 348/36 |
| 2011/0069148 A1 * | 3/2011 | Jones | H04N 5/232 |
| | | | 348/36 |
| 2014/0153916 A1 * | 6/2014 | Kintner | G03B 17/561 |
| | | | 396/419 |
| 2016/0349600 A1 * | 12/2016 | Macmillan | G03B 37/04 |

* cited by examiner

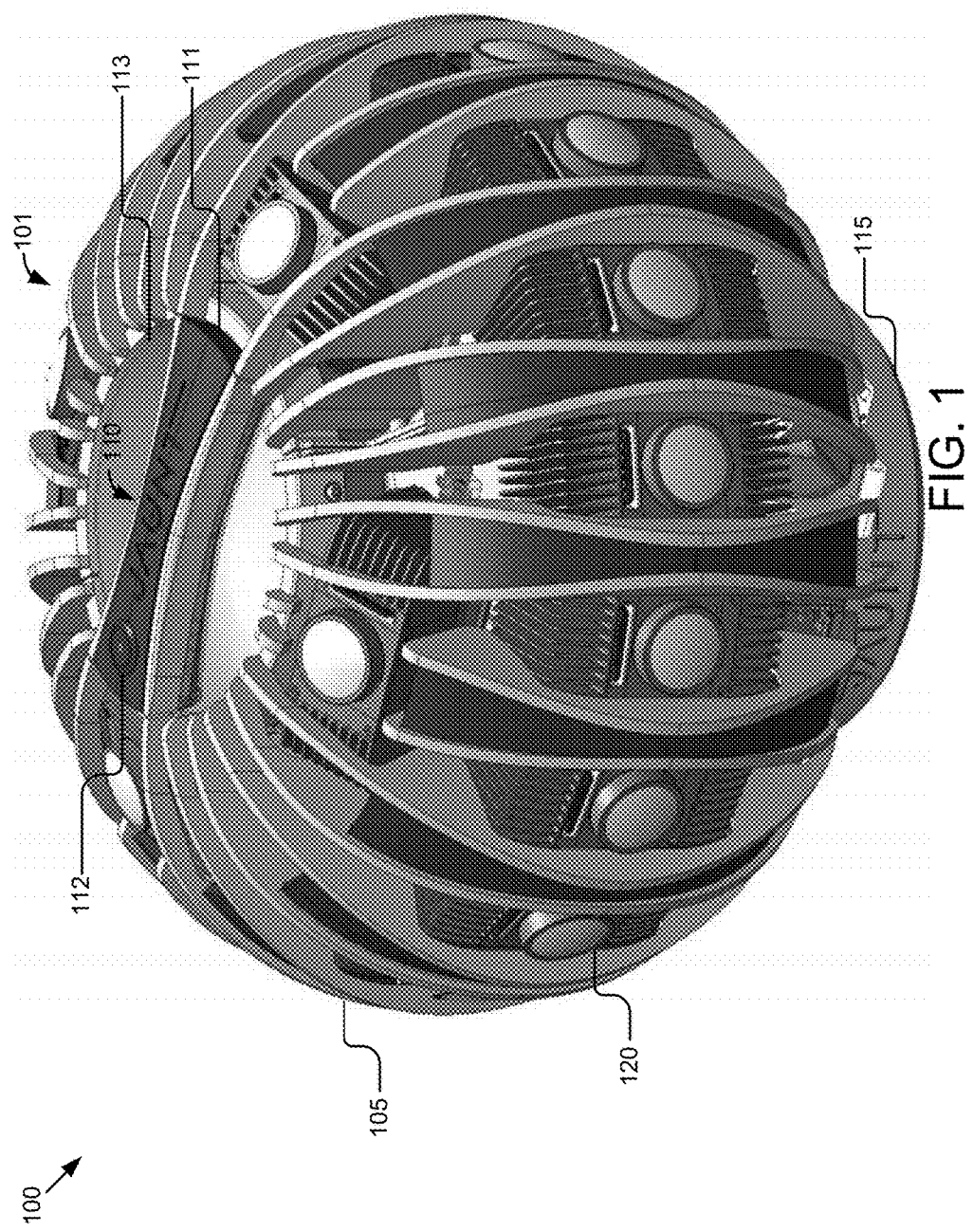

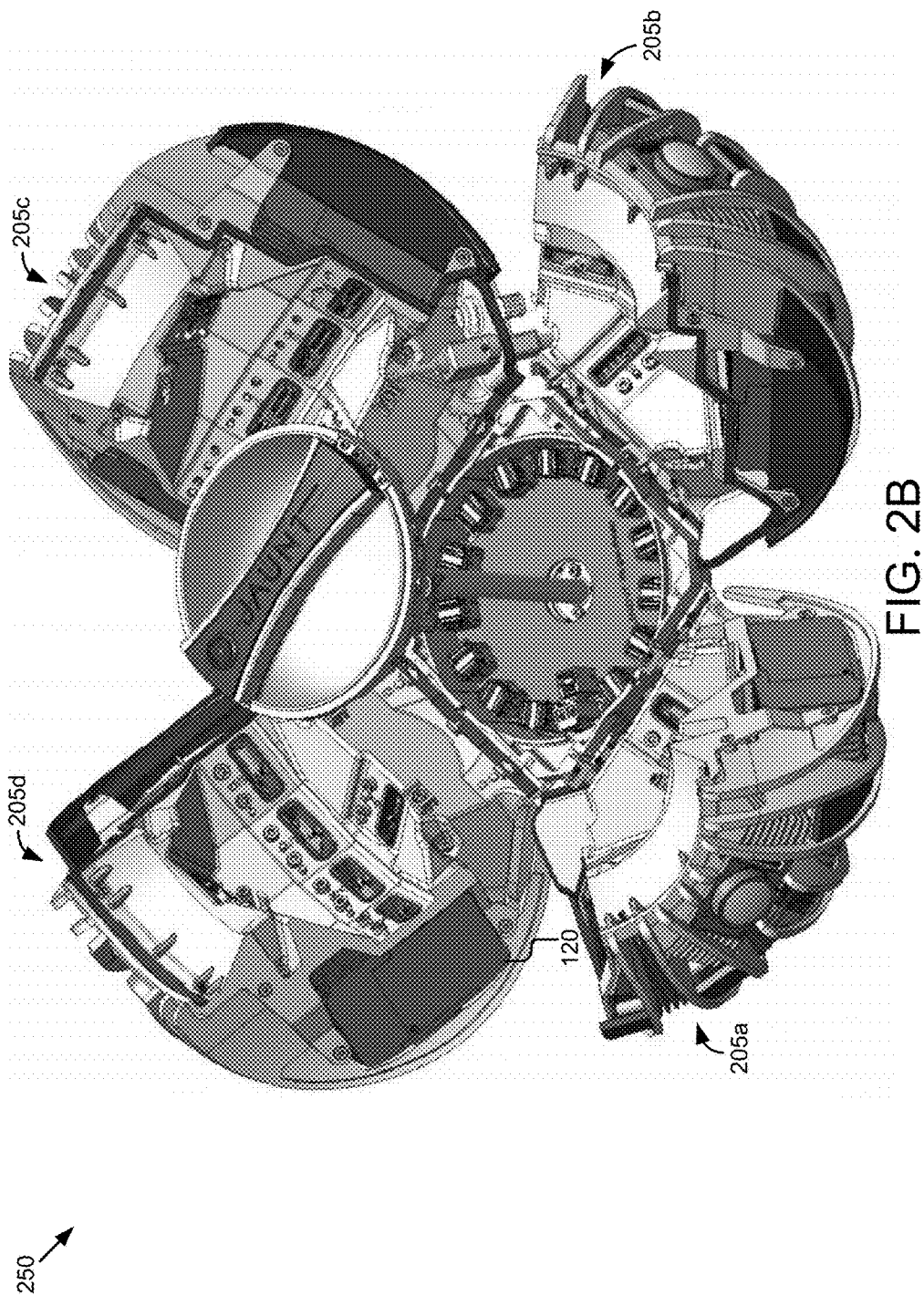

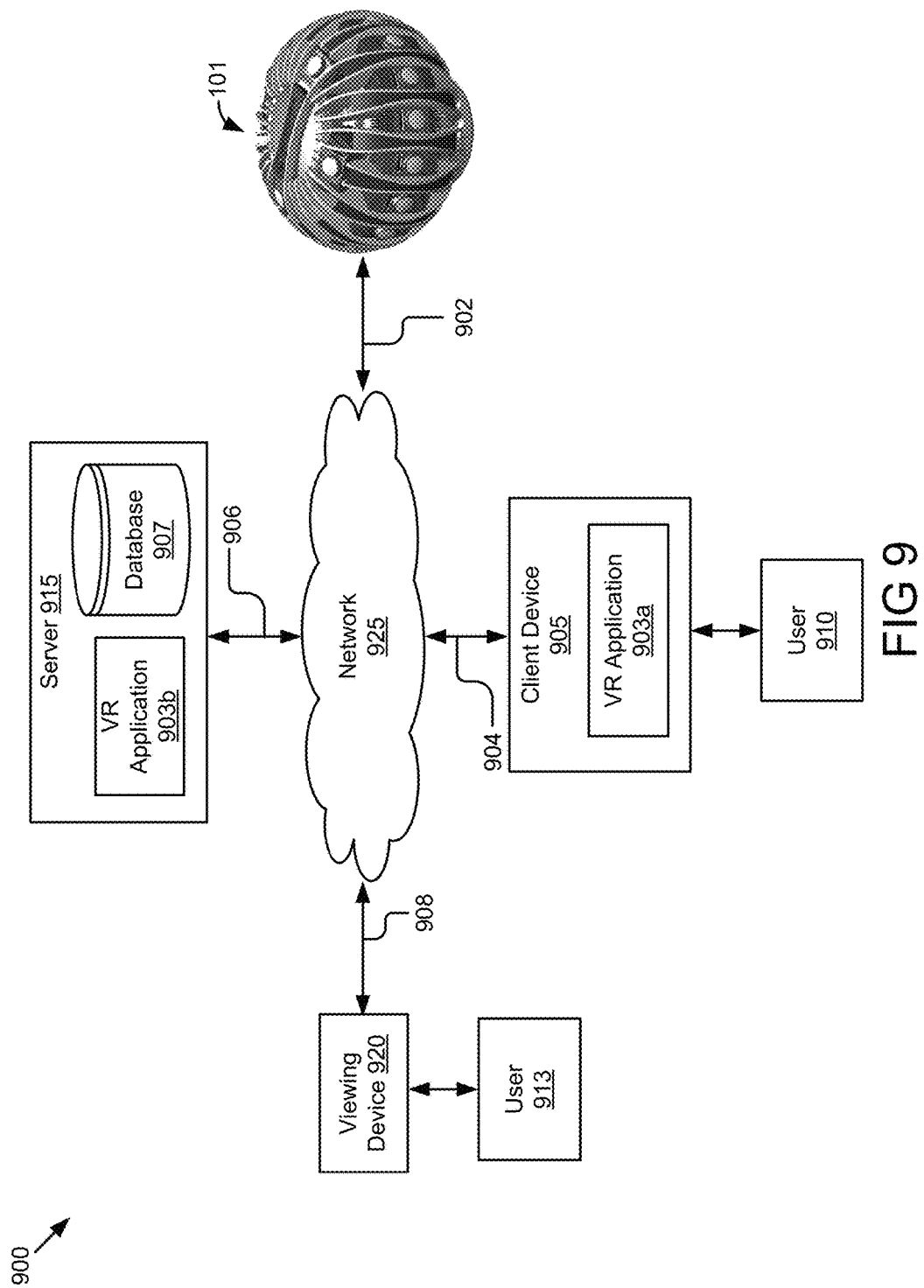

CAMERA ALLAY INCLUDING CAMERA MODULES WITH HEAT SINKS

CROSS-REFERENCE TO RELATED APPLICATIONS

This application claims the benefit of U.S. Provisional Patent Application No. 62/219,002, entitled "Camera Array," filed Sep. 15, 2015, the entirety of which is herein incorporated by reference.

FIELD

The embodiments discussed herein are related to a camera array. More particularly, the embodiments discussed herein relate to a camera array including camera modules for capturing video content with 360 degree views of an environment.

BACKGROUND

Existing camera systems using multiple cameras to record videos may generate videos with poor quality. For example, a camera system with multiple cameras and electronic components may generate an excessive amount of heat, which could cause the camera system to overheat or result in poor image quality.

A first solution for fixing the problem is to use an active cooling system, such as a fan that is included as part of the camera system. However, the fan may cause vibrations in the camera system that result in poor image quality and poor audio quality. A second solution for fixing the problem is to use the camera system for a limited amount of time. However, this may not be feasible depending on the type of video content that is being generated. For example, if the virtual reality content is being recorded at a live event, starting and stopping recording to avoid overheating may result in missing critical moments of an event.

The subject matter claimed herein is not limited to embodiments that solve any disadvantages or that operate only in environments such as those described above. Rather, this background is only provided to illustrate one example technology area where some embodiments described herein may be practiced.

SUMMARY

According to one innovative aspect of the subject matter described in this disclosure, a camera system is configured to capture video content with 360 degree views of an environment. The camera array comprises a housing comprising a first quadrant, a second quadrant, a third quadrant, and a fourth quadrant, wherein each of the first quadrant, the second quadrant, the third quadrant, and the fourth quadrant form a plurality of apertures, a chassis bottom that is removably coupled to the housing, and a plurality of camera modules, each camera module comprising a processor, a memory, a sensor, and a lens, wherein each of the camera modules is removably coupled to one of the plurality of apertures in the housing, wherein the first quadrant, the second quadrant, the third quadrant, and the fourth quadrant each include a subset of the plurality of camera modules.

In some embodiments, the first quadrant, the second quadrant, the third quadrant, and the fourth quadrant are each separately coupled to the chassis bottom by one or more hinges so that each of the first quadrant, the second quadrant, the third quadrant, and the fourth quadrant is operable to swing outward to provide access to the subset of the plurality of camera modules and the chassis bottom. In some embodiments, each of the first quadrant, the second quadrant, the third quadrant, and the fourth quadrant is substantially identical to one another. In some embodiments, the camera array further comprises a microphone array configured to capture audio for generating sound from any arbitrary direction. In some embodiments, the first quadrant comprises an internal universal serial bus cable that connects a connection hub of the chassis bottom to a client device so that the client device controls the camera array. In some embodiments, a first set of the camera modules are arranged around an equator of the camera array, a second set of the camera modules are arranged above the equator, and a third set of the camera modules are arranged below the equator. In some embodiments, the camera array operates continuously in an environment where a temperature exceeds 25 degrees Celsius. In some embodiments, each of the plurality of camera modules further comprises a micro-universal serial bus (USB) connector that, when connected to a USB cable, receives power from a connection hub. In some embodiments, each of the plurality of camera modules further comprises two daisy chain connectors to connect the camera modules in a daisy chain. In some embodiments, each of the plurality of camera modules further comprises a top heat sink and a bottom heat sink through which air passively moves. In some embodiments, the first quadrant, the second quadrant, the third quadrant, and the fourth quadrant form a weatherproof seal when closed and apertures in the housing are at least one of plugged and gasketed.

According to another innovative aspect of the subject matter described in this disclosure, a camera array is configured to capture video content with 360 degree views of an environment. The camera array comprises a housing that forms a plurality of apertures; a plurality of camera modules, each camera module comprising: one or more processors, a memory, a sensor that receives instructions for when to start and stop recording video content, and a heat sink forming fins through which air passively moves.

In some embodiments, the heat sink comprises a first heat sink and a second heat sink, the first heat sink is positioned above the lens, and the second heat sink is positioned below the lens. In some embodiments, the housing comprises a first quadrant, a second quadrant, a third quadrant, and a fourth quadrant that each include six camera modules. In some embodiments, the first quadrant, the second quadrant, the third quadrant, and the fourth quadrant each include a top camera module, a bottom camera module, and four equator camera modules, such that the camera array includes four top camera modules, four bottom camera modules, and sixteen equator camera modules. In some embodiments, each of the camera modules is removable from a corresponding quadrant.

Other aspects include corresponding methods, systems, apparatus, and computer program products for these and other innovative aspects.

The disclosure is particularly advantageous in a number of respects. First, the housing for the camera system opens like a flower into quadrants to allow for easy access to the camera modules and other components of the camera system. Second, the camera modules include heat sinks that passively cool the camera system. The heat sinks allow the camera system to record video content continuously at above room temperatures, for example, where the temperature exceeds 25 degrees Celsius. As a result, the camera system captures high-quality video content for generating virtual reality content.

BRIEF DESCRIPTION OF THE DRAWINGS

FIG. 1 illustrates an elevation view of a camera array according to some embodiments.

FIG. 2B illustrates another elevation view of the camera array with the quadrants expanded according to some embodiments.

FIG. 9 illustrates an example virtual reality system that collects and aggregates video data to generate virtual reality content according to some embodiments.

DESCRIPTION OF EMBODIMENTS

Figure 2A:
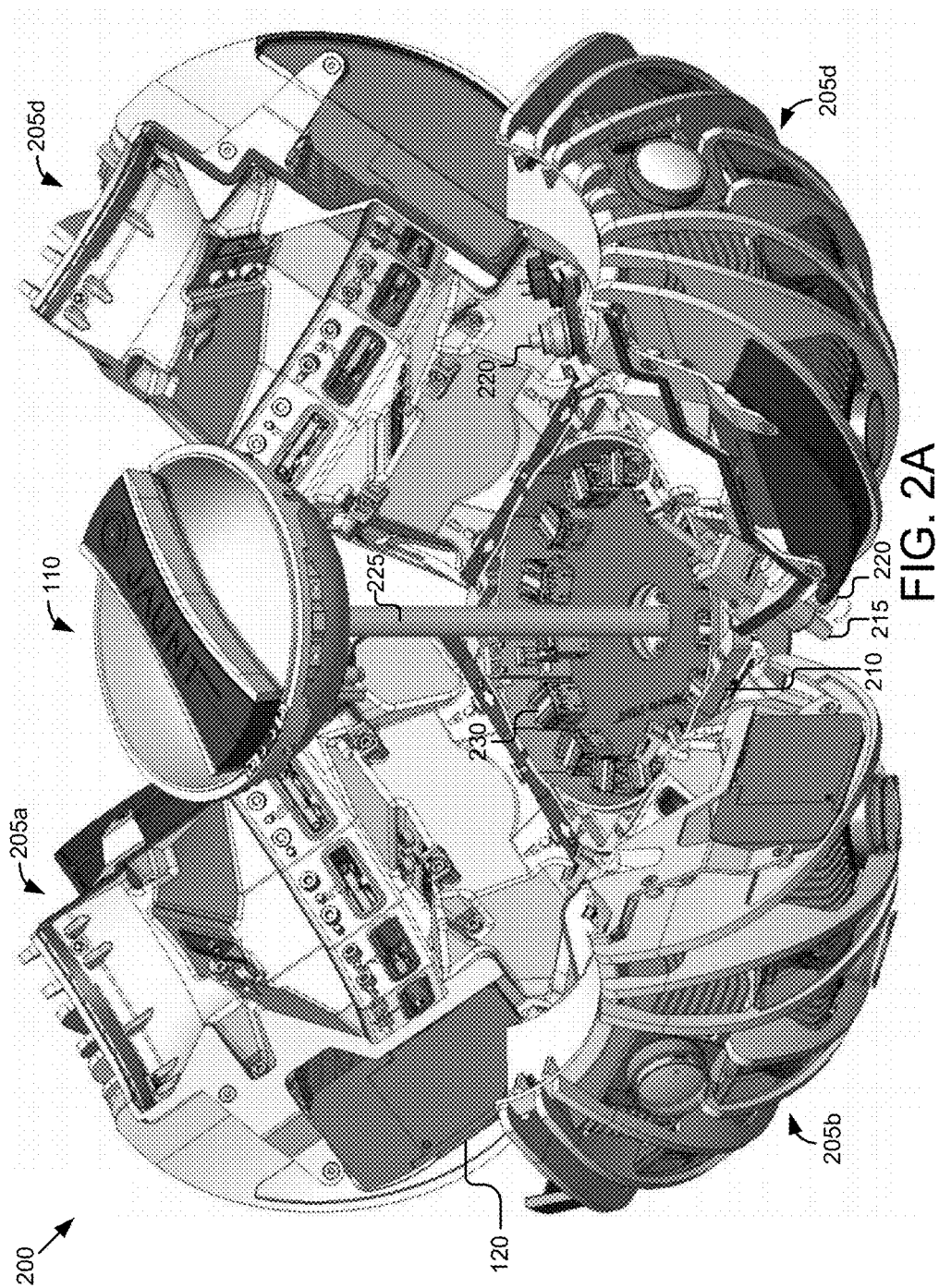
FIG. 2A illustrates another elevation view of the camera array with quadrants of the housing expanded according to some embodiments.

The disclosure relates to a camera array that is configured to capture video content with 360 degree views of an environment. The camera array may include housing, camera modules, a top, and a chassis bottom. The camera modules may be configured to capture video data of the same object or the same scene from multiple angles at the same time. Each camera module may include a processor, a memory, a sensor, a lens, and a heat sink. The camera modules in the camera array may be coupled in a daisy chain for passing control and status messages to one another via the daisy chain and synchronizing timing of image frames captured by different camera modules. For example, the camera modules are synchronized to start and to stop recording video data at the same time so that image frames from the different camera modules are synchronized.

The camera system described herein may include two types of communication mechanisms, including a first communication mechanism for data communication between the different camera modules (e.g., a bus for communication between the different camera modules) and a second communication mechanism for centrally controlling the operation of the camera modules (e.g., a control bus for controlling operations of the camera modules). A connection hub may perform the second function.

The camera modules may be coupled to the chassis bottom, which includes a connection hub for transferring video data captured by the camera modules to the client device via the connection hub. In some embodiments, the camera modules do not have built-in batteries, and the connection hub may include a battery for supplying power to the camera modules. The connection hub may be coupled to the client device for sending the video data to the client device.

The camera modules may include heat sinks for passively cooling the camera array and allowing for continuous recording. The camera modules may include a top heat sink and a bottom heat sink. The top heat sink and the bottom heat sink may be thermally coupled to the chassis bottom to dissipate heat produced by the electronics on the connection hub.

Referring now to FIG. 1, an example camera system 100 comprising a camera array 101 is illustrated according to some embodiments. In this example, the camera array 101 comprises a housing 105, a top 110, a connection hub, and camera modules 120.

The housing 105 may be formed from a single sheet or multiple sheets of a material. The housing 105 may be rigid, substantially rigid, or pliable. The material for the housing may include plastic, metal, fiberglass, leather, vinyl, neoprene, etc. The metal may include an alloy of steel or aluminum.

The housing 105 may be water resistant or waterproof. Water resistant housing may be advantageous for capturing video content in a wet environment. For example, water resistant housing may prevent damage to the camera array 101 when the camera array 101 is located on the beach or the environmental conditions are moist, such as during a rain storm. As will be discussed in greater detail below, the camera array 101 may comprise quadrants. When the quadrants are closed, as illustrated in FIG. 1, the quadrants may form a weatherproof seal that prevents liquid or particle ingress from damaging any of the sensitive electronics in the system. In some embodiments, the camera array 101 may be made waterproof by closing the quadrants and plugging and/or gasketing any apertures in the camera array 101. An aperture may be gasketed by adding a ring of rubber or another material in the aperture to form a seal. As a result, the camera array 101 may be used in a variety of environments.

As illustrated in FIG. 1, the housing 105 may form a sphere to allow the camera modules 120 to be arranged around an equator of the sphere, above the equator, and below the equator. In some embodiments, the camera array 101 may include 24 camera modules 120 with 16 camera modules 120 positioned around the equator of the sphere, four camera modules 120 positioned above the equator, and four camera modules 120 positioned below the equator. Other alternative shapes for the housing 105 are possible, such as a rectangular housing or an oval housing that maintains the configuration of having camera modules 120 around the equator, camera modules 120 above the equator, and camera modules 120 below the equator. In some embodiments, the camera modules 120 positioned around the equator may capture video content in portrait view and the camera modules 120 positioned above and below the equator may capture video content in landscape view.

The camera modules 120 may be positioned in the camera array 101 to capture video content with a 3× field of view overlap. For example, each pixel recorded by the camera array 101 may have been captured by at least three camera modules 120. The three camera modules 120 may be located side-by-side. For example, the camera modules 120 positioned along the equator may capture video content with the 3× field of view overlap. In some embodiments, the camera modules 120 above the equator and below the equator may also be positioned to capture video content with the 3× field of view overlap.

The housing 105 forms apertures through which the camera modules 120 are attached. The camera modules 120 are removably attached to the housing 105 and may be interchangeable. The camera modules 120 are described in greater detail below with reference to FIGS. 5A-5H.

The top 110 of the camera array 101 may include a handle 111, a record button 112, and a bowl 113. In some embodiments, the housing 105 may removably attach to the top 110. As will be described in greater detail below with reference to FIGS. 2A and 2B, the housing 105 may include quadrants that swing outward to provide access to the inside of the camera array 101. For example, opening the quadrants may provide access to camera modules 120 and a chassis bottom 115. The quadrants of the housing 105 may attach to the top 110 by connecting interlocking parts along a rim of the top 110 and a rim of the quadrants. The quadrants may be removably coupled to the bowl 113 for added stability. When the quadrants are attached to the top 110, a user may advantageously move the camera array 101 by holding the handle 111.

In some embodiments, a user may start and stop video recording of the camera array 101 by pressing a record button 112 located on the handle 111. The record button 112 may include light-emitting diodes (LEDs) in the shape of a ring that change color or light up when the camera array 101 is recording or in a standby state. Persons of ordinary skill in the art will understand that the record button is optional and that the recording may be activated using other mechanisms, such as a remote control, by controlling the camera array 101 from a client device that is communicatively coupled to the camera array 101, a record button in a different location, a timer, etc. In some embodiments, the handle 111 may also include a logo of the company that manufacturers the camera array 101.

The chassis bottom 115 of the camera array 101 may include a connection hub. The connection hub may include hardware for supplying power to the camera modules 120, receiving video data, and/or transmitting video data. The hardware may include a wired connection (e.g., universal serial bus (USB) cable, an Ethernet cable, a high-definition multimedia interface (HDMI) cable, a RCA cable, Firewire, CameraLink, Thunderbolt or custom bus to transmit image data) or a wireless connection (e.g., wireless fidelity (Wi-Fi), Bluetooth, etc.). The hardware may be used to receive video data from the camera modules 120 and aggregate the video data. In other embodiments, the video content may be wirelessly transmitted or transmitted using a memory card stored in each of the camera modules 120.

The connection hub may receive and aggregate streams of video data describing image frames from the respective camera modules 120. The video data may be compressed. In some embodiments, the connection hub includes a memory card or other non-transitory memory where the video data is stored. The connection hub may then transfer the video data to a client device. In some embodiments, the video data is streamed through the connection hub to the client device. In other examples, a user may manually remove the memory card from the connection hub and extract the video data from the memory card using the client device.

Turning to FIG. 2A, an example system 200 of a camera array 101 is illustrated where the housing 105 forms quadrants 205a, 205b, 205c, 205d. In this example, the housing 105 is divided into a first quadrant 205a, a second quadrant 205b, a third quadrant 205c, and a fourth quadrant 205d. The quadrants 205 may be substantially identical to each other in that they include similar hardware, such as camera modules 120 and similar connectors.

The quadrants 205 are attached to the chassis bottom 115 by one or more hinges 210. The hinges 210 may include clips that attach to a portion of the quadrants 205 and the chassis bottom 115, the hinges 210 may span a length of the quadrants 205, etc.

In some embodiments, each quadrant 205a, 205b, 205c, and 205d includes a labelling of a letter on the internal side of the quadrant 205a, 205b, 205c, and 205d and each aperture for a camera module 120 includes a labelling of a number to identify a location of each of the camera modules 120. For example, quadrant 205a is labelled with two A's near the hinge 210 and the apertures for the camera modules 120 are labelled 1, 2, 5, and 6 for the camera modules 120 around the equator, 3 for the camera module 120 above the equator, and 4 for the camera module 120 below the equator.

The lettering and numbering may be helpful to identify a particular camera module 120, for example, if the particular camera module 120 is identified as having malfunctioned.

In some embodiments, one or more of the quadrants 205 may also include an internal USB cable 215 that connects the connection hub to the outside world. For example, the internal USB cable 215 may attach to a client device (e.g., a laptop) and allow the client device to control the camera array 101 functions, such as starting or stopping recording of video content, viewing a preview of the video content, etc. In FIG. 2A the internal USB cable 215 is illustrated as being part of quadrant 205c, but other variations are possible, such as including the USB cable 215 on a different quadrant 205 or multiple quadrants 205.

In some embodiments, one of the quadrants 205 includes a power connector 220 that protrudes from inside the camera array 101 and attaches to a power source external to the camera array 101. The power connector 220 may be composed of metal. The power source may include a power cable that connects to one or more batteries for supplying power to the camera modules 120 while allowing the camera array 101 to be portable.

In some embodiments, the power source may include a power cord, such as a power cord that attaches to a wall outlet. The power source may also include a generator, a power inverter, or any combination of these elements to provide power to the camera modules 120. The power source may be alternating current (AC) or direct current (DC). In some embodiments, the power source may be an AC power supply that is converted to a DC power supply. For example, AC voltage from a generator or wall outlet is routed through a power inverter to provide DC voltage for the camera modules 120. The power source may also include a power step down element to refine the power supply to a voltage level compatible with one or more loads. For AC voltage, the power step down element may include one or more step-down transformers or any other element or combination of elements configured to step down AC voltage. For DC voltage, the power step down element may include one or more series voltage dropping resistors, a voltage divider network or any other element or combination of elements configured to step down DC voltage. For example, AC voltage from a generator or wall outlet is routed through a power inverter to provide DC voltage, and this DC voltage is routed through one or more series voltage dropping resistors to drop the DC voltage to a level appropriate for powering the camera modules 120.

In some embodiments, the top 110 is attached to the chassis bottom 115 by a post 225. The post 225 provides stability for the camera array 101. The post 225 may connect to equipment used for stabilizing and positioning the camera array 101, such as a tripod, a dolly, a steady cam, a camera cart, etc.

The connection hub of the chassis bottom 115 may include USB connectors 230 that connect to USB cables to provide power to each of the camera modules 120 and printed circuit board assemblies (PCBAs). In some embodiments, the USB cables may connect to micro-USB connectors in the camera modules 120.

Although not illustrated in the figures, the camera array 101 may include a microphone array for capturing sound from all directions. For example, the microphone array may include a Dolby ATMOS toolset that follows the principles of ambisonics, enabling reconstruction of sound from any arbitrary direction. In another example, the microphone array includes a Core Sound Tetramic soundfield tetrahedral microphone array. In yet another example, the microphone array includes an Eigenmike, which advantageously includes a greater number of microphones and, as a result, can perform higher-order (i.e., more spatially accurate) ambisonics. The microphone array may be mounted to the top of the camera array 101, be positioned between camera modules 120, or be positioned within the body of the camera array 101. In some embodiments, each camera module 120 may include a separate microphone and the audio from the microphone array may be synchronized with the audio from each of the camera modules 120.

Turning to FIG. 2B, an example system 250 with the camera array 101 is illustrated. In this example, the opened quadrants 205a, 205b, 205c, and 205d illustrate the accessibility of the camera array 101. A user may access the connection hub and attach power cables to the camera modules 120. In addition, the accessibility makes it easier to service the camera array 101 when any of the camera modules 120 or other parts of the camera array 101 malfunction.

FIG. 2B also illustrates that a portion of the camera modules 120 are exposed to the inside of the camera array 101 and are not separated by the housing. For example, the camera module 120 in quadrant 205d includes a top heat sink that is thermally coupled to the inside of the camera array 101 such that heat from the connection hub may dissipate through the top heat sink.

Figure 3:
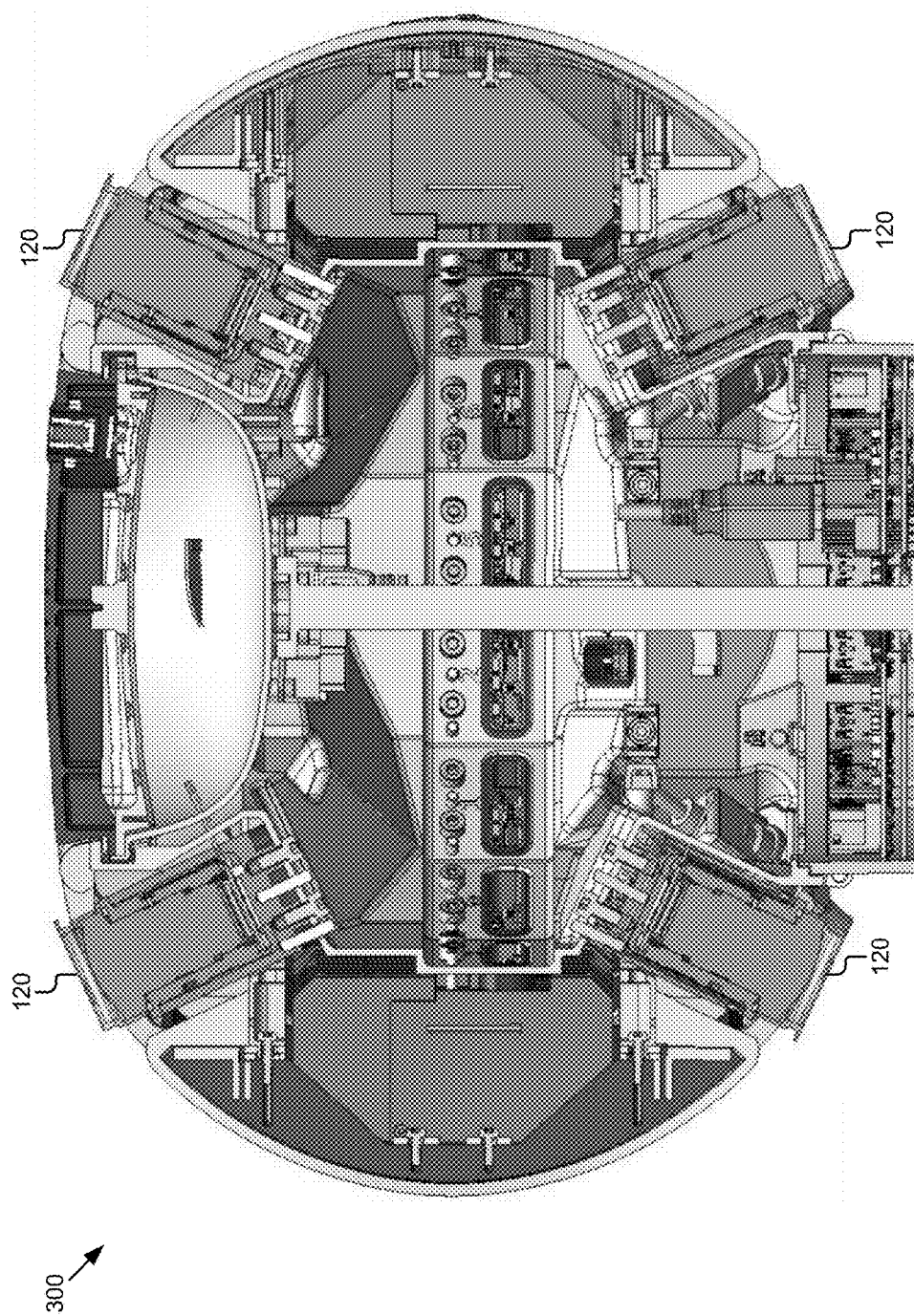
FIG. 3 illustrates a section view of the camera array from the side according to some embodiments.

Turning to FIG. 3, a section view of an example system 300 of the camera array 101 is illustrated. In this example, the quadrants are closed and the camera modules 120 are illustrated with the backside of the camera modules 120 positioned around the equator, the camera modules 120 positioned above the equator, and the camera modules 120 positioned below the equator.

Figure 4:
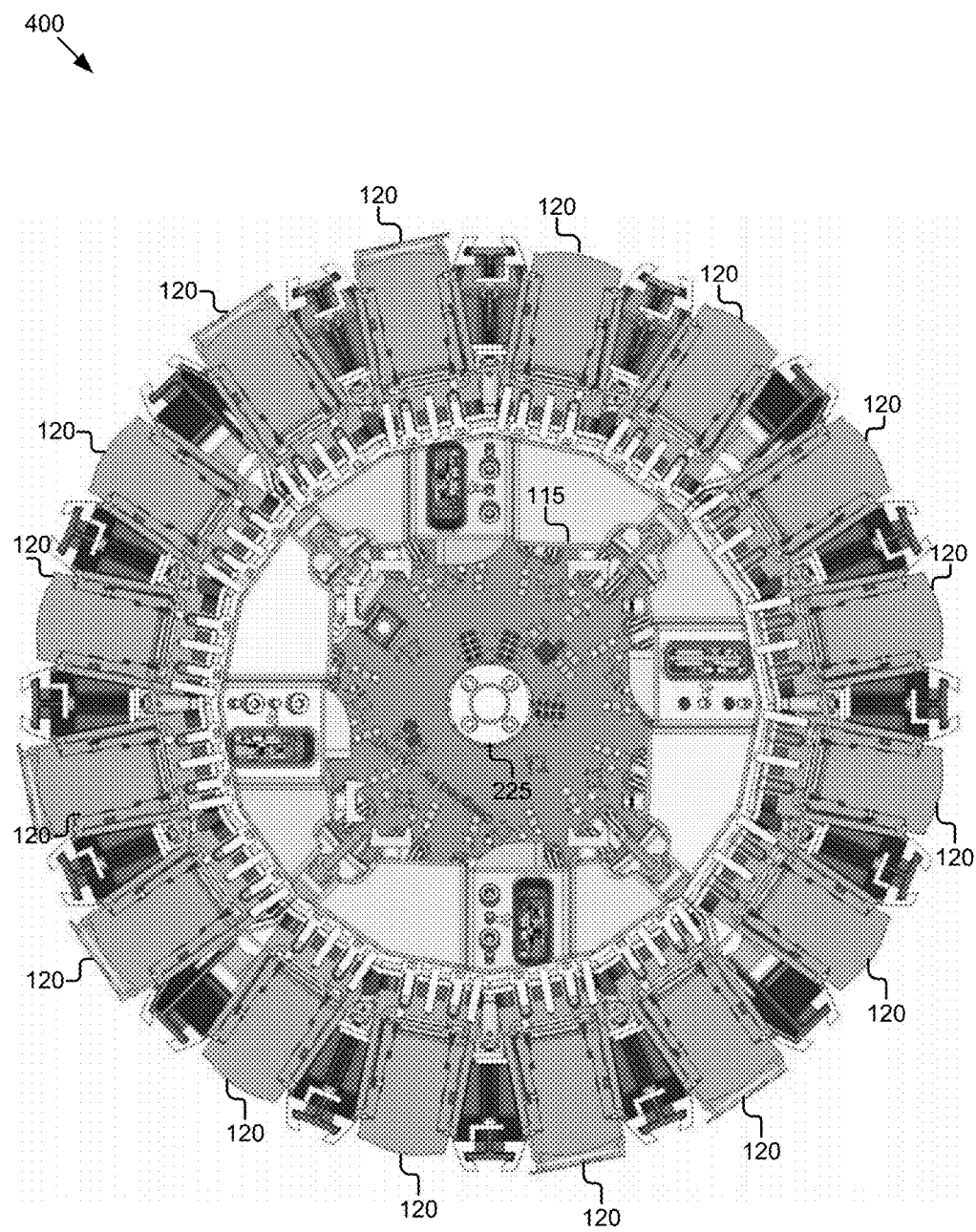
FIG. 4 illustrates a plan view of the camera array according to some embodiments.

Turning to FIG. 4, a plan view of an example system 400 of the camera array 101 is illustrated. In this example, the sixteen camera modules 120 that are positioned around the equator and the four camera modules 120 that are positioned below the equator are illustrated. In addition, the chassis bottom 115 and the post 225 are visible in the center of the camera array 101.

The camera module 120 comprises a camera body 600, top heat sink 505, and a bottom heat sink 520. The camera module 120 is discussed in detail below with reference to FIGS. 5A-5H. The camera body 600 is discussed in detail below with reference to FIGS. 6A-6H. The top heat sink 505 is discussed in detail below with reference to FIGS. 7A-I. The bottom heat sink 520 is discussed in detail below with reference to FIGS. 8A-I.

Figure 5A:
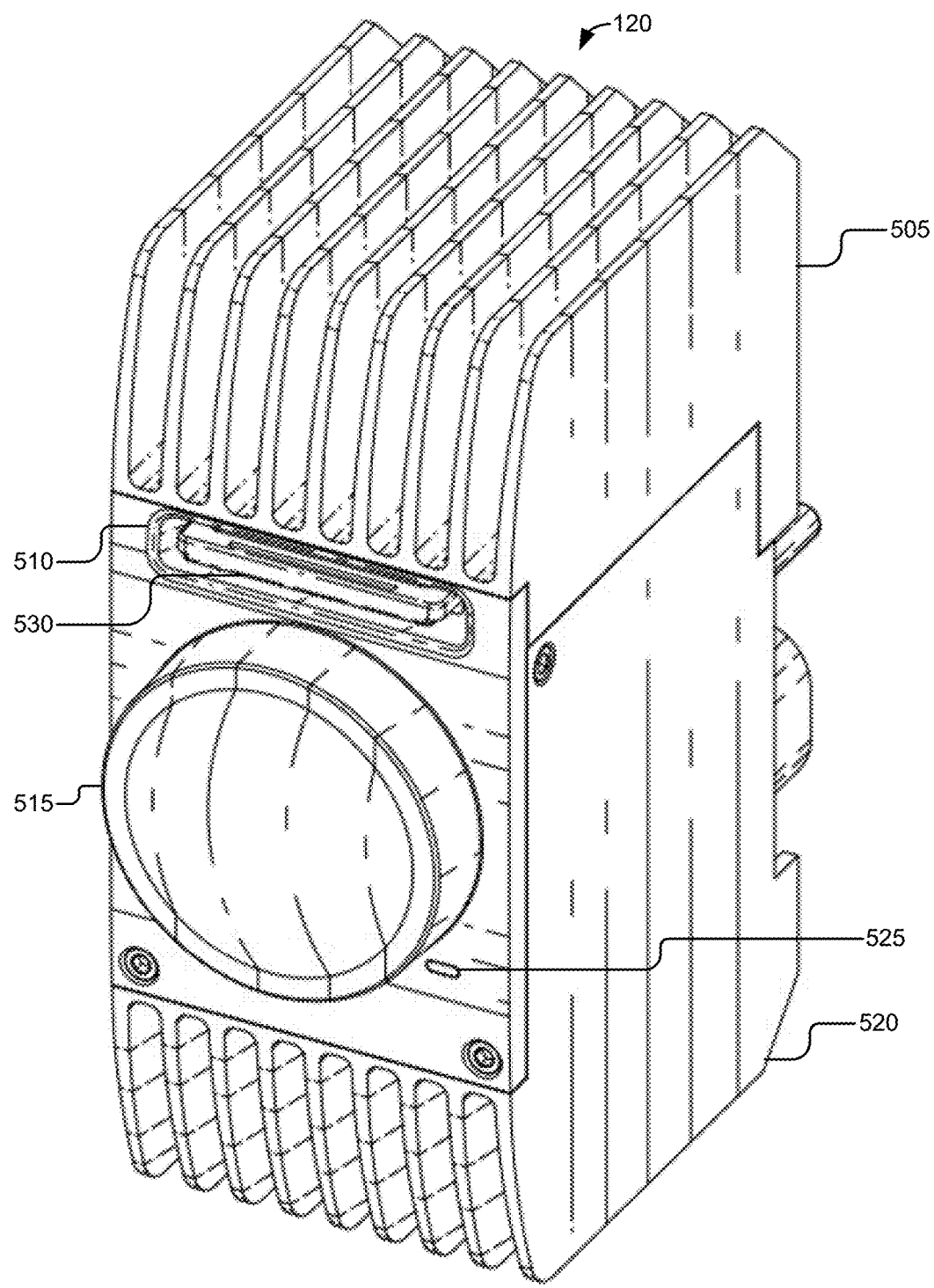
FIG. 5A illustrates a front elevation view of a camera module according to some embodiments.

Turning to FIG. 5A, a front elevation view of a camera module 120 is illustrated. In some embodiments, the same type of camera module 120 may be used in each of the locations in the housing 105. In some embodiments, one of the camera modules 120 is a master camera module 120 that dictates when the other camera modules 120 start and stop recording video. The camera module 120 may comprise a processor (not shown), a memory (not shown), a sensor (not shown), an image signal processor (ISP) (not shown), a switch (not shown), a lens 515, a status indicator 525, a heat sink 505, 520, and a memory card slot 510.

The processor may include an arithmetic logic unit, a microprocessor, a general purpose controller or some other processor array to perform computations and provide electronic display signals to a display device. The processor may process data signals and may include various computing architectures including a complex instruction set computer (CISC) architecture, a reduced instruction set computer (RISC) architecture, or an architecture implementing a combination of instruction sets. Although the specification refers to a single processor in the camera module 120, the camera module 120 may include multiple processors.

The memory includes a non-transitory memory that stores data for providing the functionality described herein. The memory may be a dynamic random access memory (DRAM) device, a static random access memory (SRAM) device, flash memory or some other memory devices. In some embodiments, the memory may include one or more camera memory cards 530 that fit into the memory card slot 510. The one or more memory cards may store video data (e.g., image frames) captured by the camera module 120. Example memory cards include, but are not limited to, a secure digital (SD) memory card, a miniSD card, a secure digital high capacity (SDHC) memory card, a secure digital extra capacity (SDXC) memory card, a compact flash (CF) memory card, a memory stick, a multimedia card (MMC), smart media, an xD-picture card, etc.

The sensor is any device that senses physical changes. For example, the sensor may be a device that converts an optical image to electrical signals. For example, the sensor captures light and converts the captured light into an electrical signal. Example sensors include, but are not limited to, semiconductor charge-coupled devices (CCD), active pixel sensors in complementary metal-oxide-semiconductor (CMOS), and N-type metal-oxide-semiconductor (NMOS, Live MOS), etc. Other example sensors are possible.

In some embodiments, the sensor may be a 1/1.2 inch native high definition sensor that uses a global shutter method to capture an entire image frame at the same instant. The sensor may capture up to 120 frames per second and be configurable for time lapse capture. This sensor may be advantageous for environments with low light and fast moving objects. In some embodiments, the sensor may be a 1 inch, 20 megapixel (MP) sensor that uses a rolling shutter method to capture images by scanning across a scene rapidly. The sensor may capture up to 60 frames per second and be configurable for time lapse capture. This sensor may be advantageous for outdoor environments and time lapse photography.

The sensor may capture video data in different formats including HD (high definition), full HD, Ultra High Definition (UHD), 4 k, etc.

In some embodiments, the sensor includes a depth sensor. In some embodiments, the depth sensor determines depth using structured light, such as a speckle pattern of infrared laser light. For example, the depth sensor may include the PrimeSense depth sensor. In another embodiment, the depth sensor determines depth using time-of-flight technology that determines depth based on the time it takes a light signal to travel between the camera and a subject. The depth sensor may be used to determine a depth map.

In some embodiments, the sensor includes a motion detector. For example, the sensor is a gyroscope that measures orientation of the camera module 120. In another example, the sensor is an accelerometer that is used to measure acceleration of the camera module 120. In yet another example, the sensor includes location detection, such as a global positioning system (GPS), location detection through triangulation via a wireless network, etc.

In some embodiments, the sensor includes a microphone for recording audio. Even if the camera array 101 has a separate microphone, including a microphone in each camera module 120 may be valuable for generating 3D audio to play with the 3D video.

The ISP receives an electrical signal from the sensor and performs demosaicing to determine pixel color from the electrical signals. In some embodiments, the ISP controls autofocus, exposure, and white balance. In some embodiments the maximum ISO is 3200. In some embodiments, the ISP compresses video data for faster transmission. In some other embodiments, the video data is compressed by an aggregation system. The aggregation system may be stored on a client device. The ISP embeds a device identifier (e.g. the serial number) for the camera module 120 that captured the video data in the video data.

In some embodiments, the ISP generates a metadata log associated with each frame that includes attributes associated with the image frame and any image processing performed on the image file. For example, the metadata file includes what kind of exposure and color processing was used.

In some embodiments where one of the camera modules 120 is a master camera module 120a, the master camera module 120a may include a switch for controlling an operation of the master camera module 120a. For example, the switch may include a micro-switch or a button used to control a start operation and a stop operation of the master camera module 120a. The switch may be exterior to the master camera module 120a and activated by a user. In another embodiment, the switch is inside the master camera module 120a.

In some embodiments, the switch is controlled wirelessly. For example, the switch may be controlled via dedicated short-range communication (DSRC), wireless fidelity (WiFi), Bluetooth™, or any other wireless communication protocol. In some embodiments, the switch is a tangible hardware device. In other embodiments, the switch is code and routines stored on a tangible, non-transitory memory and executed by one or more processors. For example, the switch may be code and routines that are stored on a tangible, non-transitory memory and controlled by a processor-based computing device via a wired or wireless communicative coupling. The tangible, non-transitory memory that stores the code and routines of the switch may or may not be an element of the processor-based computing device that controls the switch via a wired or wireless communicative coupling.

In some embodiments, the master camera module 120a may control other camera modules 120n. The master camera module 120a may control operations of other camera modules 120n in the same camera array 101. For example, an initiation of a start operation in the master camera module 120a may also cause an initiation of a start operation in other camera modules 120n so that all the camera modules 120 in the camera array 101 are synchronized to start recording video data at the same time, respectively. An initiation of a stop operation in the master camera module 120a may also cause an initiation of a stop operation in other camera modules 120n so that all the camera modules 120 in the camera array 101 are synchronized to stop recording video data at the same time, respectively.

As a result, the switch not only controls the operation of the master camera module 120a, but also simultaneously controls operations of other camera modules 120n in the camera array 101. For example, a user may press the switch a first time to start recording video data using the camera modules 120 in the camera array 101. The user may press the switch a second time to stop recording video data using the camera array 101.

The lens 515 may be an optical device capable of transmitting and refracting lights and converging or diverging a beam of light. For example, the lens 515 may be a camera lens. In some embodiments, the lens may have a 130 degree diagonal field of view (FOV) with an f-number of 2.9 (f/2.9).

The status indicator 525 may be a device configured to indicate a status of the camera module 120. A status of the camera module may be one of a normal status and a faulty status. For example, the status indicator 525 indicates a normal status of the camera module 120 if the camera module 120 functions properly. However, the status indicator 525 may indicate a faulty status of the camera module 120 if a fault occurs at the camera module 120. For example, the fault status may be triggered when the storage space in the memory is full, indicating no more video data captured by the camera module 120 may be stored in the memory. The status indicator may also indicate other statuses, for example indicating the camera is booting up or shutting down, or that a hardware error has been detected.

In some embodiments, the status indicator 525 may include an LED. The LED may emit light if the status indicator 525 indicates a normal status. Alternatively, the LED may not emit light if the status indicator 525 indicates a faulty status. In some embodiments, the LED may emit multiple colors of light or emit light at different rates in order to indicate different statuses. For example, the status indicator 525 may emit a green light to indicate a normal status and a red light to indicate a faulty status. The faulty status may be further differentiated into types by blinking on and off to indicate that the memory is full, two blinks and a two-second pause to indicate a problem with the hardware.

The heat sink may include a top heat sink 505 and a bottom heat sink 520. The top heat sink 505 and the bottom heat sink 520 may each include a plurality of fins to increase the surface area of the top heat sink 505 and the bottom heat sink 520, respectively. In FIG. 5A both the top heat sink 505 and the bottom heat sink 520 include nine fins that are vertically oriented. Although the fins are configured with nine fins in a vertical orientation, in some embodiments the top heat sink 505 and the bottom heat sink 520 may include a different number of fins in different orientations. For example, the top heat sink 505 may include four fins, the bottom heat sink 520 may include twenty fins, and the fins may be horizontally oriented or diagonally oriented.

In some embodiments, the top heat sink 505 and the bottom heat sink 520 are composed of a thermally conductive material, such as metal, for dissipating heat produced by electronics in the camera array. In some embodiments, the thermal conductivity of the top heat sink 505 and the bottom heat sink 520 is higher than the thermal conductivity of the housing 105. The top heat sink 505 and the bottom heat sink 520 act passively to cool the inside of the camera array by allowing air to vent through the fins. Because the bottom heat sink 520 is closest to the connection hub, in some embodiments the bottom heat sink 520 draws heat away from different components on multiple printed circuit board assemblies (PCBAs) on the connection hub and/or on the camera body.

The use of the heat sinks as passive coolers is advantageous over other camera array designs that use active elements to cool the camera array, such as fans or by pumping coolant. The other camera array designs may be disadvantageous because the fans may create vibrations that interfere with video capture and audio capture. In addition, using tubes with coolant may create an excessively heavy camera array and may fail to cool the camera array as effectively as the top heat sink 505 and the bottom heat sink 520.

The top heat sink 505 and the bottom heat sink 520 may be integrated into the mechanical structure of the camera module 120. For example, the top heat sink 505 may comprise part of a cover for the camera module 120 and the bottom heat sink 520 may be part of a housing of the camera module 120. The top heat sink 505 and the bottom heat sink 520 may be designed to be symmetrical on a vertical axis and a horizontal axis of the lens 515.

Figure 5B:
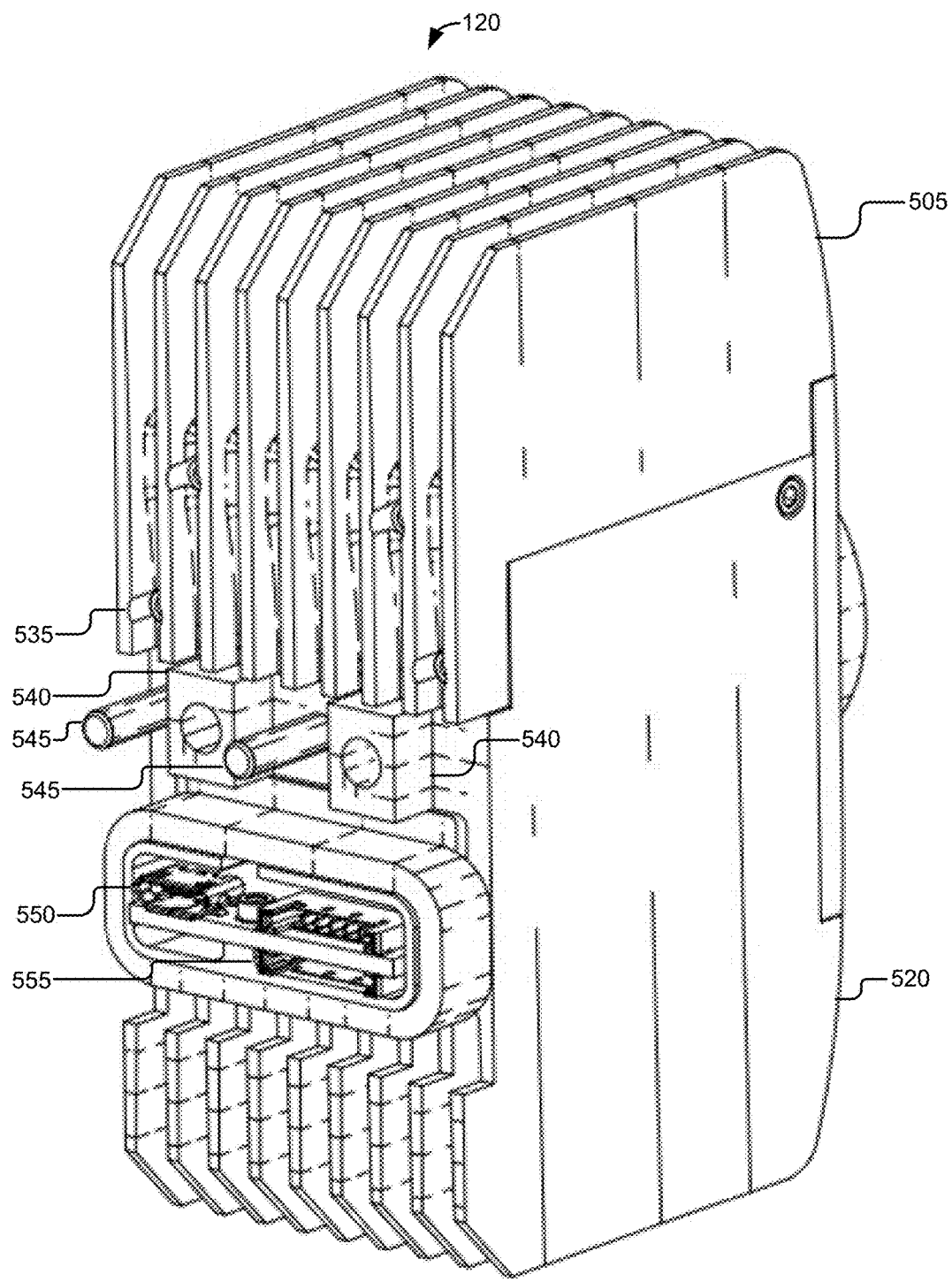
FIG. 5B illustrates a back elevation view of the camera module according to some embodiments.

Turning to FIG. 5B, a back elevation view of the camera module 120 is illustrated. The camera module 120 comprises bolts 535, blocks 540, posts 545, a micro-universal serial bus (USB) connector 550, and daisy chain connectors 555. In some embodiments, the top heat sink 505 includes bolts 535 to attach the top heat sink 505 to the bottom heat sink 520.

The bottom heat sink 520 includes structures for aligning the camera module 120 with corresponding quadrants 205 on the camera array 101. As illustrated in FIG. 5B, the bottom heat sink 520 may include two blocks 540 that each form apertures. The blocks 540 connect to fasteners on the quadrants 205. Similarly, the bottom heat sink 520 includes two posts 545 that fit into a hole and slot on a corresponding quadrant 205 of the camera array 101.

The camera module 120 may also include connectors for supplying power to the camera module 120 and for receiving and transferring data to and from the connection hub. In the example illustrated in FIG. 5B, the camera module 120 includes a micro-USB connector 550. A micro-USB cord connects the camera module 120 to the USB connectors 230 on the connection hub to power the camera module 120 via the micro-USB connectors 550.

The camera modules 120 in the camera array 101 may form a daisy chain in which the camera modules 120 are connected in sequence. For example, a first camera module 120a is connected to a second camera module 120b, which is connected to an nth camera module 120n. The camera modules 120 in the camera array 101 are synchronized through the daisy chain. One camera module 120 (e.g., the first camera module 120a) in the daisy chain may be configured as a master camera module 120a that allows the camera array 101 to act as one entity by controlling clock signals for other camera modules 120n in the camera array 101. The clock signals may be used to synchronize operations of the camera modules 120 in the camera array 101.

The camera module 120 also includes two daisy chain connectors 550—one that connects to an upstream camera module 120 in the chain and one that connects to a downstream camera module 120 in the chain. In some embodiments, the cables that attach to the daisy chain connectors 550 run between camera modules 120 to carry synchronization, control, and status information between the camera modules 120 in the camera array 101.

The master camera module 120a may be connected to a second camera module 120b via the daisy chain connectors 550 to control a start operation or a stop operation of the camera module 120b. For example, when the master camera module 120a starts to record video data, a clock signal may be transmitted to the second camera module 120b via the daisy chain connectors 550, causing the master camera module 120a and the second camera module 120b to start recording video data at the same time, respectively. When the master camera module 120a stops recording video data, no clock signal is transmitted to the second camera module 120b, causing the master camera module 120a and the second camera module 120b to stop recording video data at the same time, respectively.

In some embodiments, the master camera module 120a communicates with the second camera module 120b. In another embodiment, the master camera module 120a communicates with a connection hub that is connected to a client device, such as a laptop, which communicates the instructions back through the connection hub to the camera module 120b.

The second camera module 120b is connected to a next camera module 120n in the daisy chain via the daisy chain connectors 550 to supply a clock signal from the second camera module 120b to the next camera module 120n, so that operations of the next camera module 120n is synchronized with the second camera module 120b by the clock signal.

As a result, operations (e.g., the start operations, the stop operations) of the camera modules 120 in the camera array 101 are synchronized, and the image frames in the respective video data captured by the camera modules 120 are also synchronized. An initiation of a start operation (or a stop operation) in the master camera module 120a may simultaneously cause an initiation of a start operation (or a stop operation) of all the other camera modules 120 in the camera array 101. Thus, the daisy chain formed by the camera modules 120 may be configured to synchronize start operations and stop operations of the camera modules 120, causing image frames captured by the camera modules 120 to be synchronized. The clock signals in the camera modules 120 may have a frequency of 60 Hz so that the camera modules 120 in the camera array 101 capture 60 image frames per second, respectively.

In addition to the status indicator 525 on each camera module 120, in some embodiments, the camera array 101 additionally includes an overall status indicator (e.g., a light-emitting diode (LED)) coupled to the last camera module 120n in the daisy chain. The overall status indicator may also be coupled to the master camera module 120a in the daisy chain. The overall status indicator may indicate an overall status of the camera array 101. If all of the camera modules 120 in the camera array 101 are fault-free (e.g., all camera modules 120 function properly), the overall status indicator indicates a normal status for the camera array 101. However, if a fault occurs to at least one of the camera modules 120, the overall status indicator indicates a faulty status for the camera array 101. By using the overall status indicator in the camera array 101 and respective individual status indicators 525 in the camera modules 120, the overall status of the camera array 101 and the individual statuses of the camera modules 120 may be monitored at any time. For example, if a memory card in a camera module 120 is full, both the overall status indicator and the individual status indicator 525 corresponding to the camera module 120 may indicate a faulty status, allowing a user operating the camera array 101 to determine which camera module 120 has a fault.

Figure 5C:
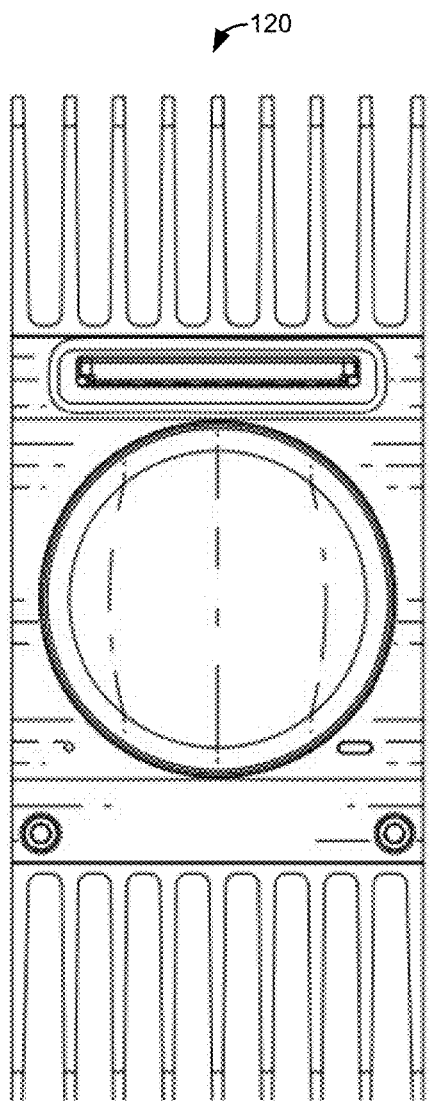
FIG. 5C illustrates another front elevation view of the camera module according to some embodiments.

FIG. 5C illustrates another front elevation view of the camera module 120. This view illustrates the space between the fins on the top heat sink 505 and the bottom heat sink 520, which aids in passively cooling the camera array 101 by creating airflow between the fins. In some embodiments, the camera module 120 may include a microphone port 560, which leads to the microphone inside the camera module 120.

Figure 5D:
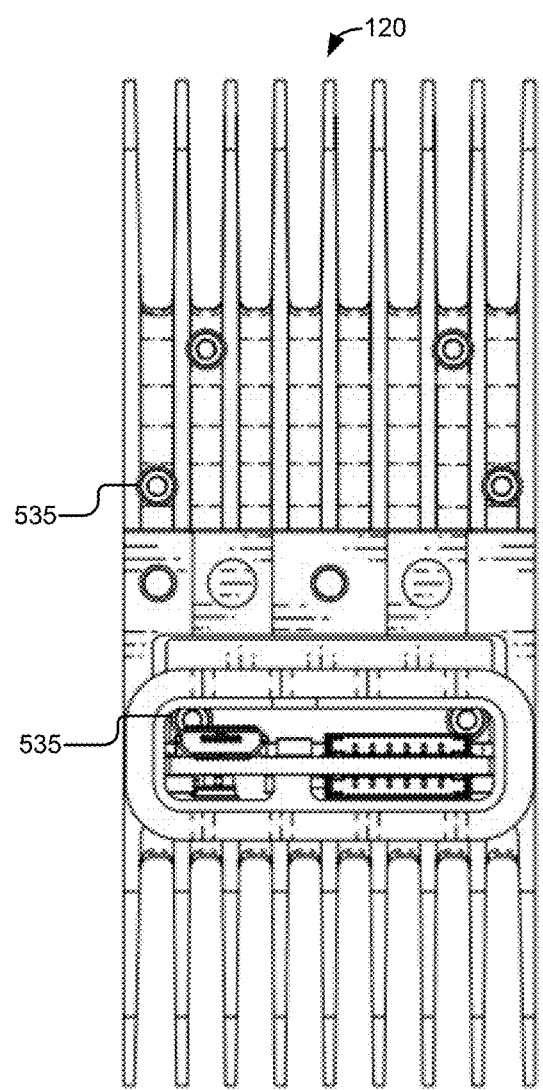
FIG. 5D illustrates another back elevation view of the camera module according to some embodiments.

FIG. 5D illustrates another back elevation view of the camera module 120 according to some embodiments. This view provides a head-on view of the heads of the bolts 535. In this example, the bolts 535 that attach the portion of the back that includes connectors to the bottom heat sink 520 are also visible. Although FIG. 5D illustrates bolts 535, it will be appreciated that other equipment may be used to secure the heat sinks 505, 520 to the camera body 600.

Figure 5E:
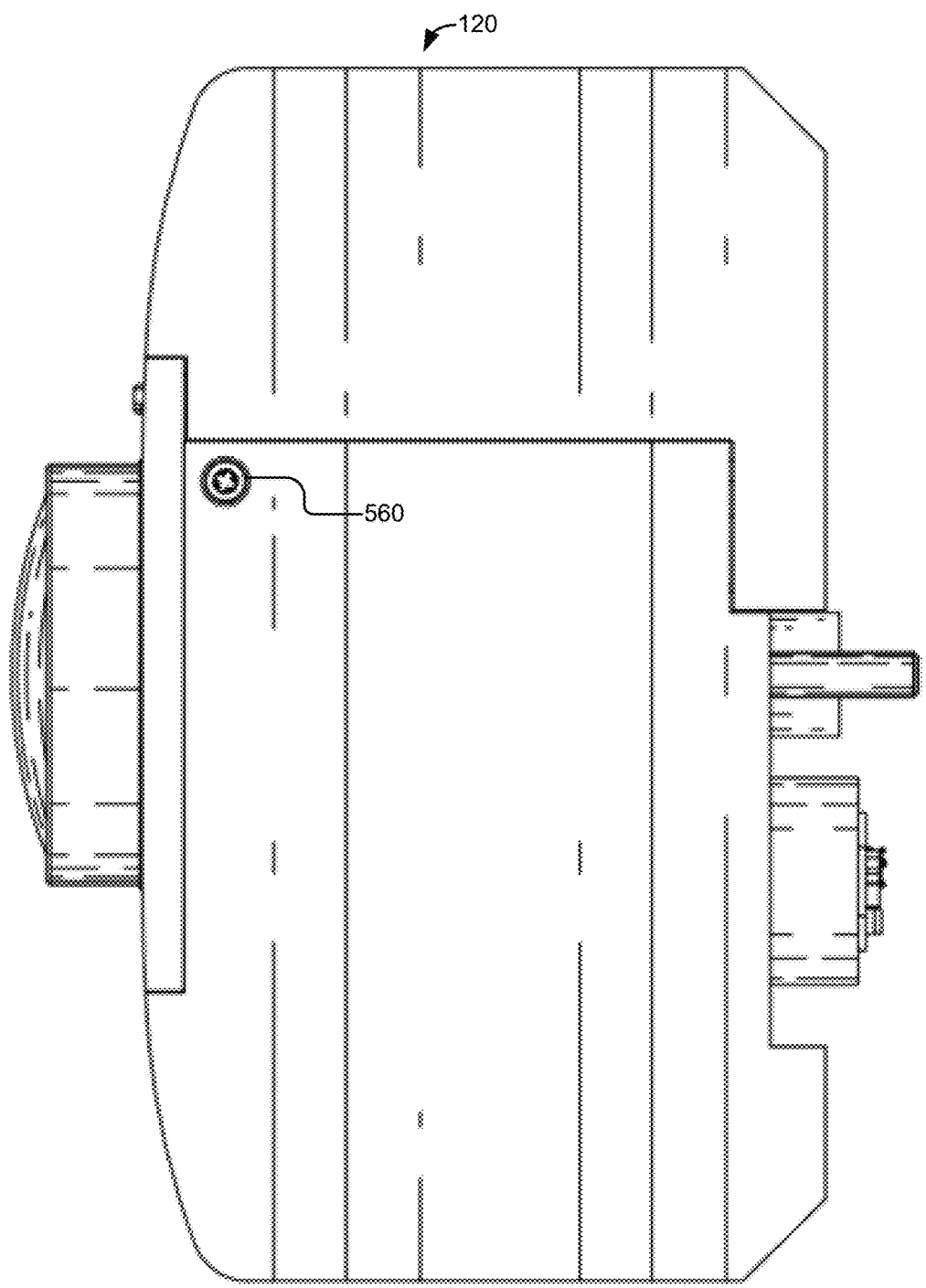
FIG. 5E illustrates a side elevation view of the camera module according to some embodiments.
Figure 5F:
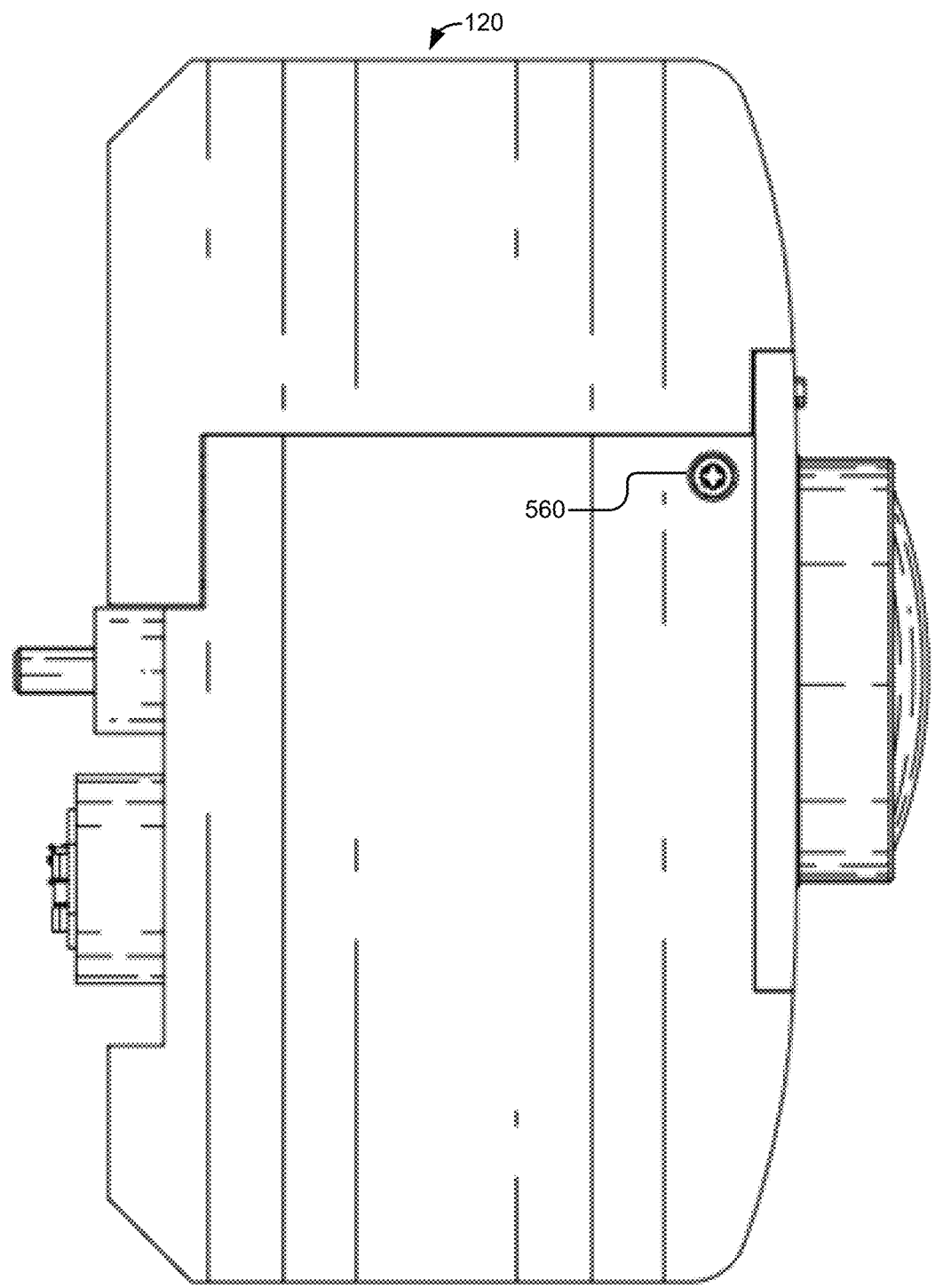
FIG. 5F illustrates another side elevation view of the camera module according to some embodiments.
Figure 5G:
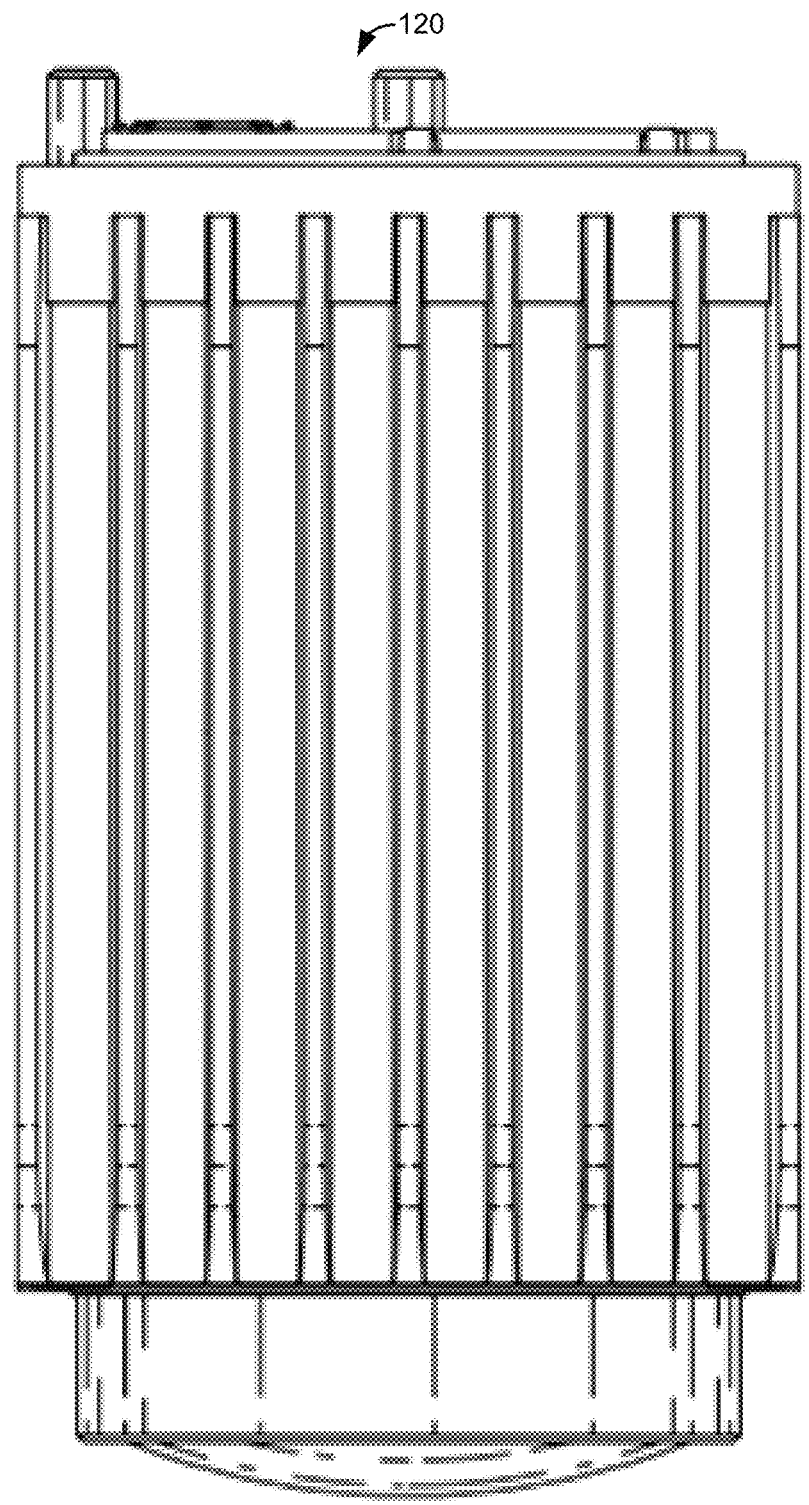
FIG. 5G illustrates a plan view of the camera module according to some embodiments.
Figure 5H:
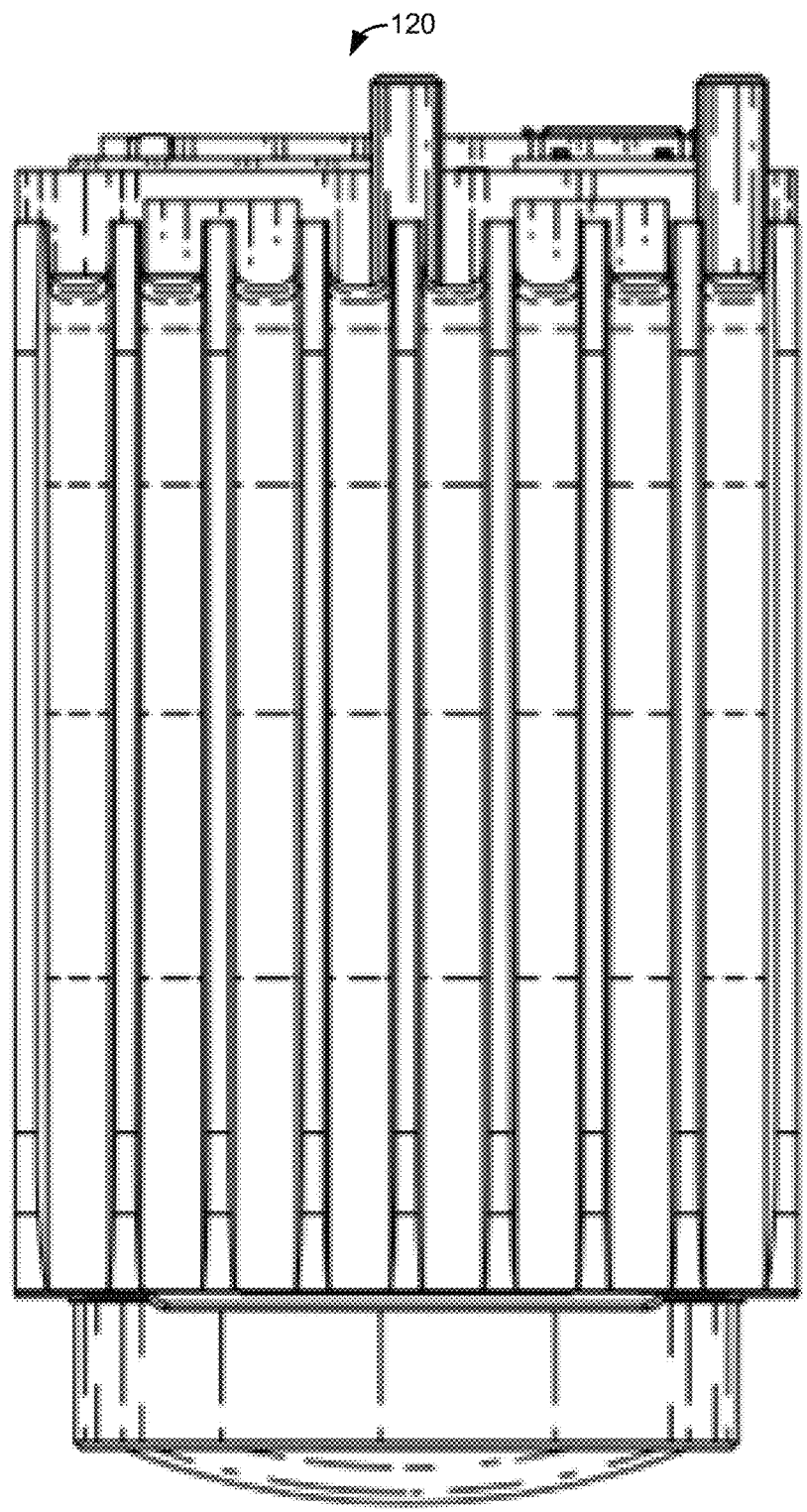
FIG. 5H illustrates a bottom view of the camera module according to some embodiments.

FIG. 5E illustrates a side elevation view of the camera module 120 according to some embodiments. FIG. 5F illustrates another side elevation view of the camera module 120 according to some embodiments. Both examples include a view of a screw 565 that attaches the bottom heat sink 520 to the body of the camera module 120. FIG. 5G illustrates a plan view of the camera module 120 according to some embodiments. FIG. 5H illustrates a bottom view of the camera module 120 according to some embodiments.

The camera body 600 may comprise a processor (not shown), a memory (not shown), a sensor (not shown), an image signal processor (ISP) (not shown), a switch (not shown), a lens 515, a status indicator 525, a memory card slot 510, a micro-USB connector 550, and daisy chain connectors 555.

Figure 6A:
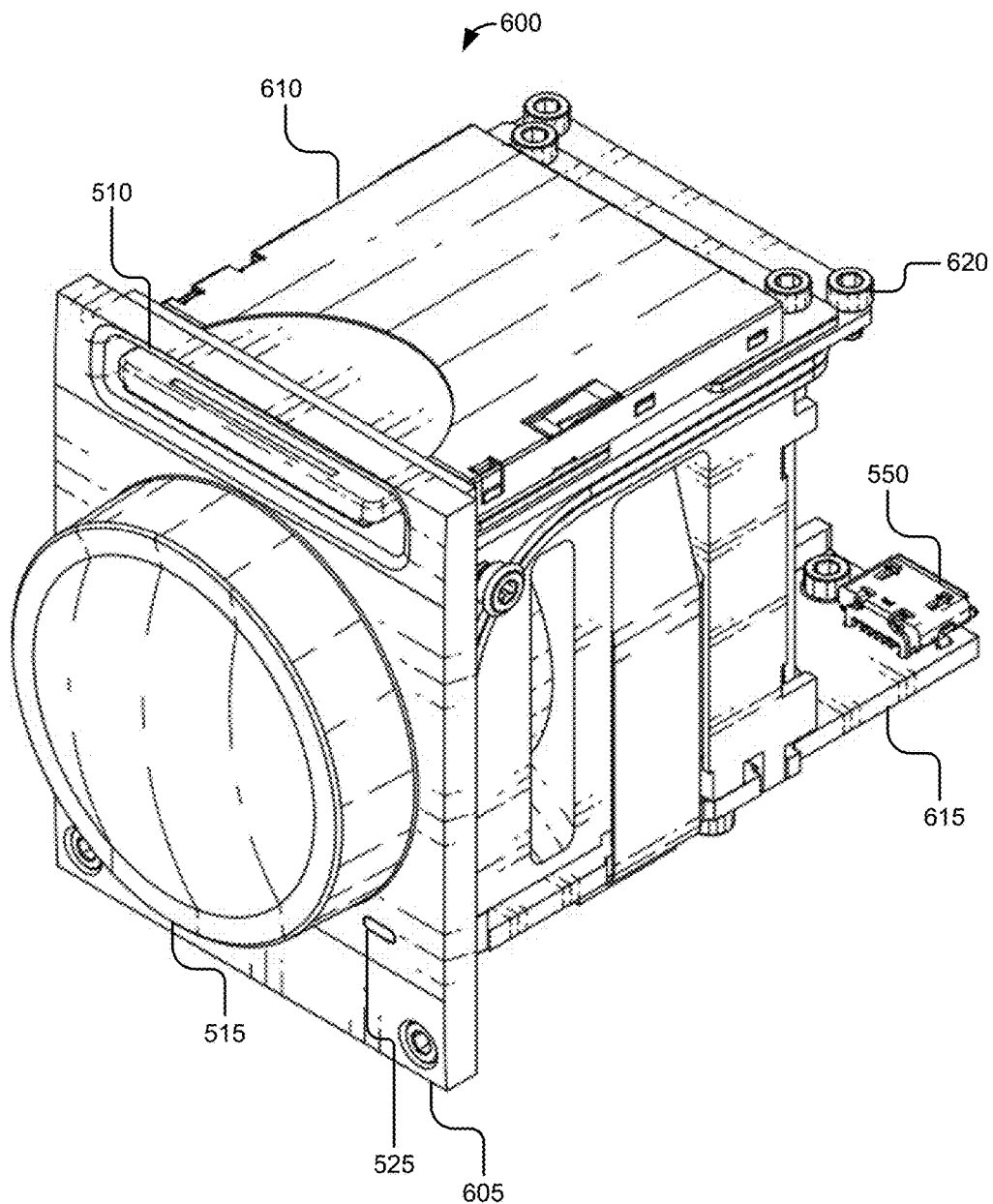
FIG. 6A illustrates an angled side elevation view of a camera body according to some embodiments.

Turning to FIG. 6A, an angled side elevation view of the front of the camera body 600 is illustrated. The camera body 600 comprises a camera face 605 and a top portion 610. The camera face 605 includes apertures for the memory card slot 510, the lens 515, the indicator 525, and for inserting screws or bolts to affix the camera body 600 to the lower heat sink 520. The top portion 610 includes bolts 620 that are used to attach the top heat sink 505 to the camera body 600.

A printed circuit board (PCB) 615 is mounted onto the camera body 600. The PCB 615 serves as a mount for the micro-USB connector 550.

Figure 6B:
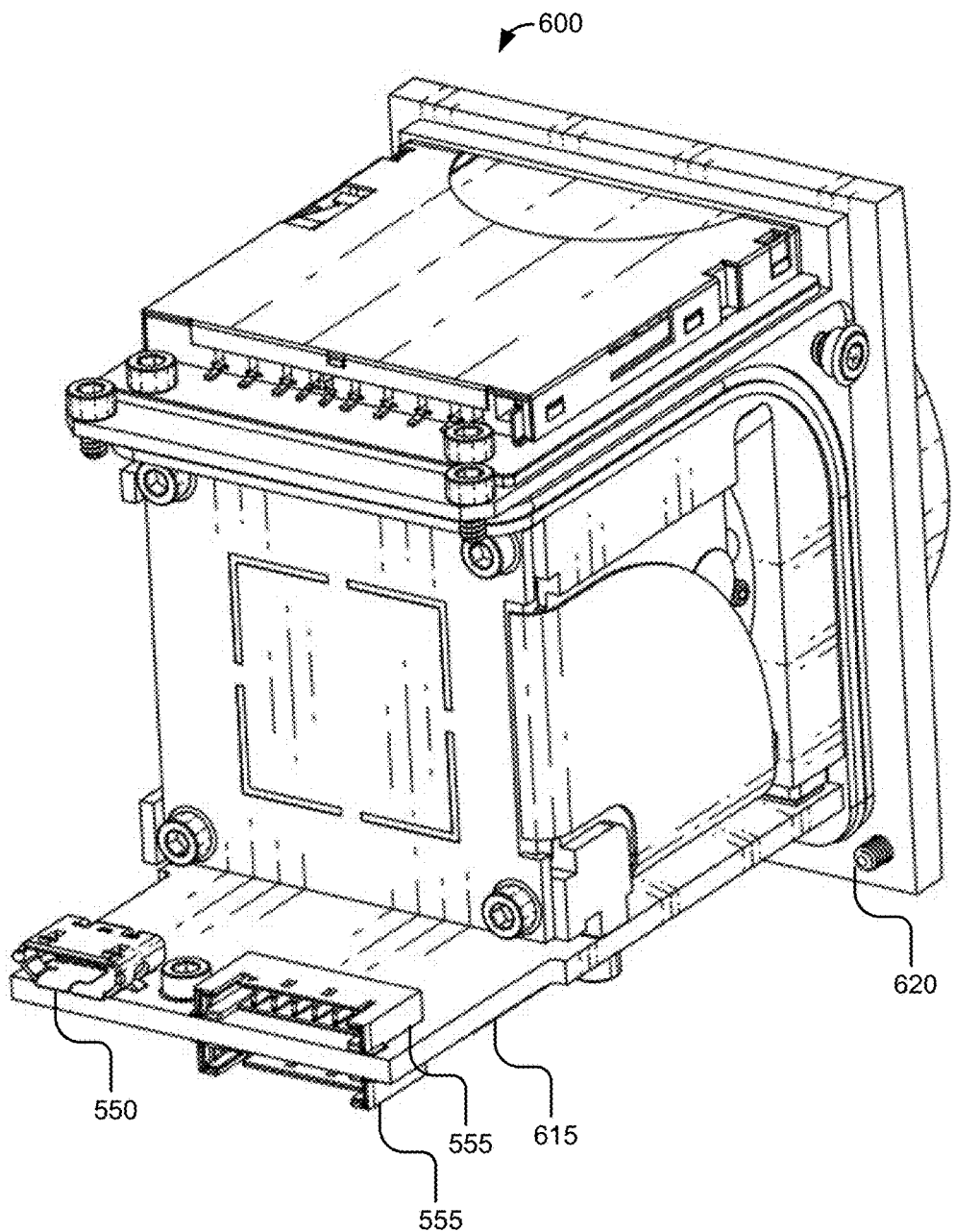
FIG. 6B illustrates another angled side view of the camera body according to some embodiments.

FIG. 6B illustrates an angled side view of the back of the camera body 600 according to some embodiments. From this angle, the bottom of the bolts 620 used to attach the camera body 600 to the bottom heat sink 520 are visible. In addition, the PCB 615 is illustrated as including a mount for both the micro-USB connector 550 and the daisy chain connectors 555.

Figure 6C:
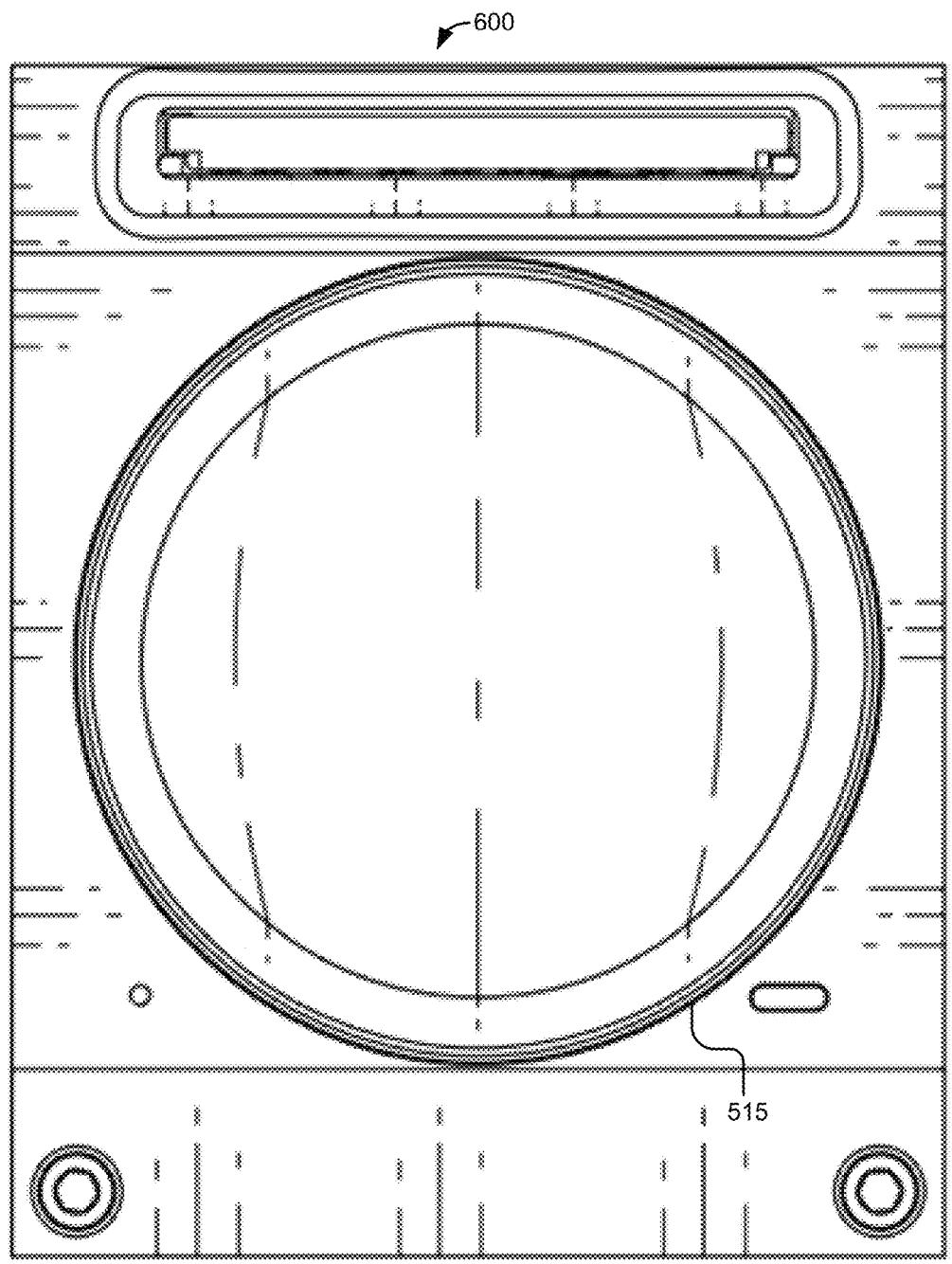
FIG. 6C illustrates a front elevation view of the camera body according to some embodiments.
Figure 6D:
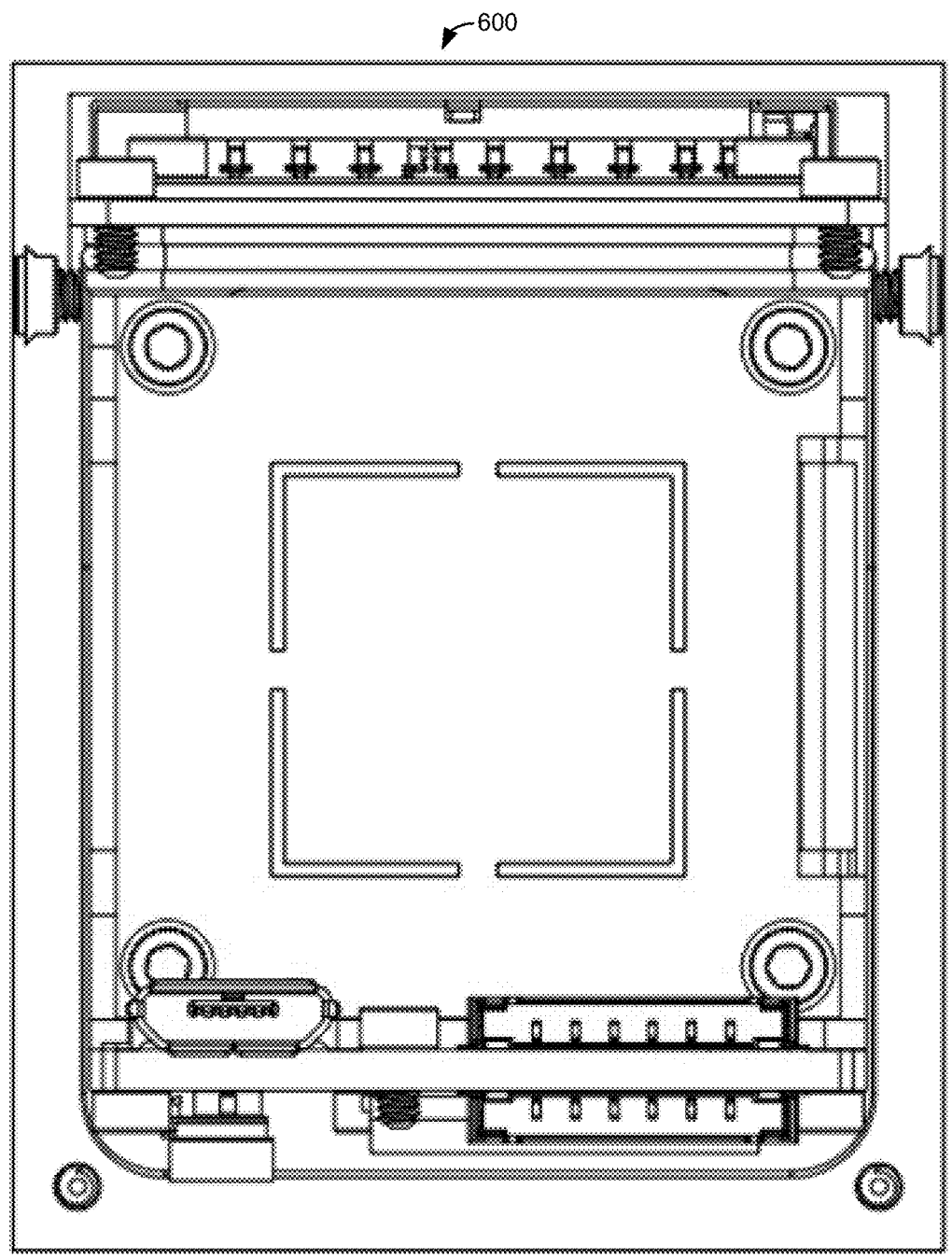
FIG. 6D illustrates a back elevation view of the camera body according to some embodiments.

FIG. 6C illustrates a front elevation view of the camera body 600 according to some embodiments. FIG. 6C helps illustrate the symmetrical placement of the lens 515 within the camera body 600. FIG. 6D illustrates a back elevation view of the camera body 600 according to some embodiments.

Figure 6E:
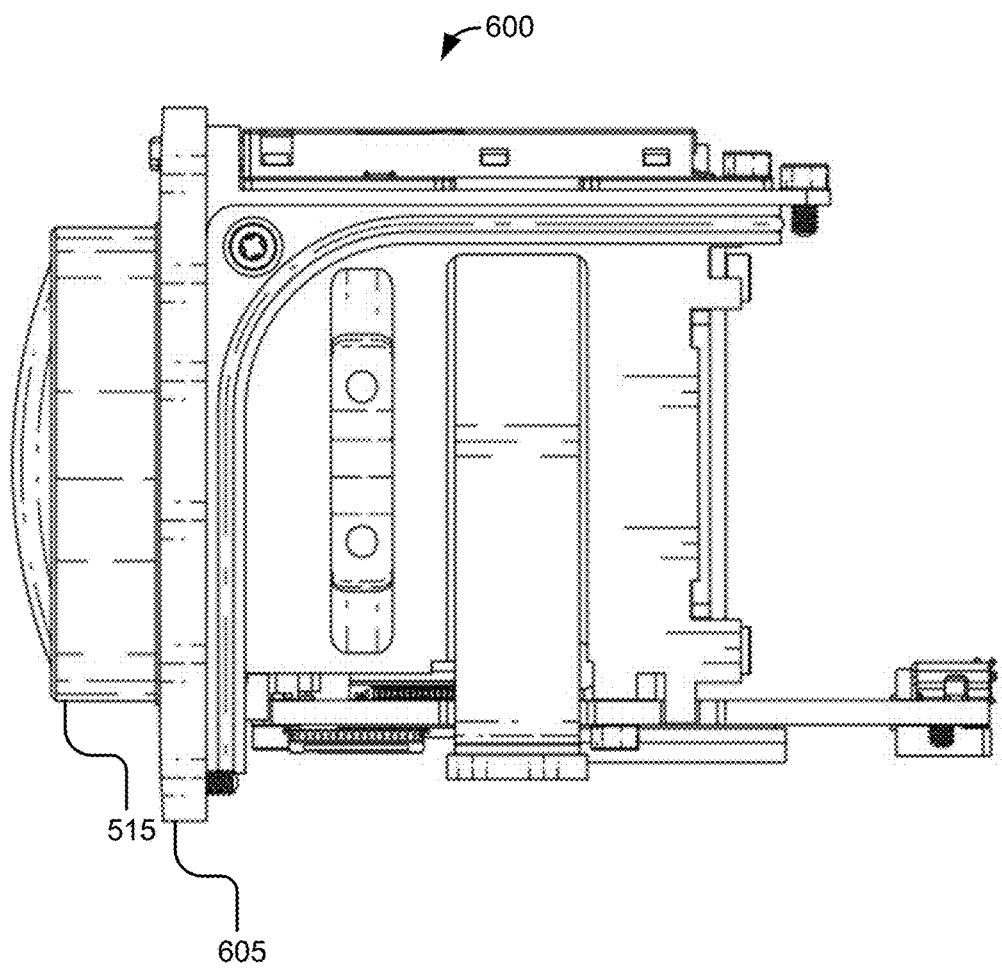
FIG. 6E illustrates a side elevation view of the camera body according to some embodiments.
Figure 6F:
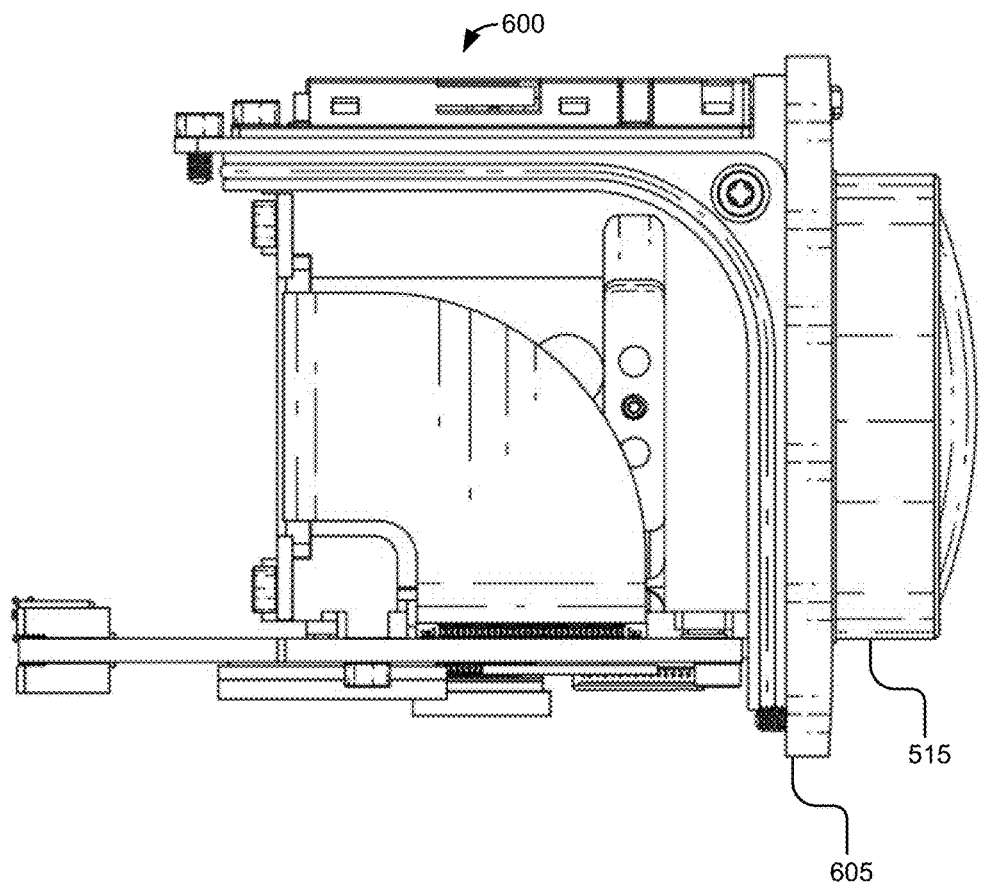
FIG. 6F illustrates another side view of the camera body according to some embodiments.

FIG. 6E illustrates a side elevation view of the camera body 600 according to some embodiments. FIG. 6F illustrates another side view of the camera body 600 according to some embodiments. In both example, the lens 515 is illustrated as protruding out of the camera face 605.

Figure 6G:
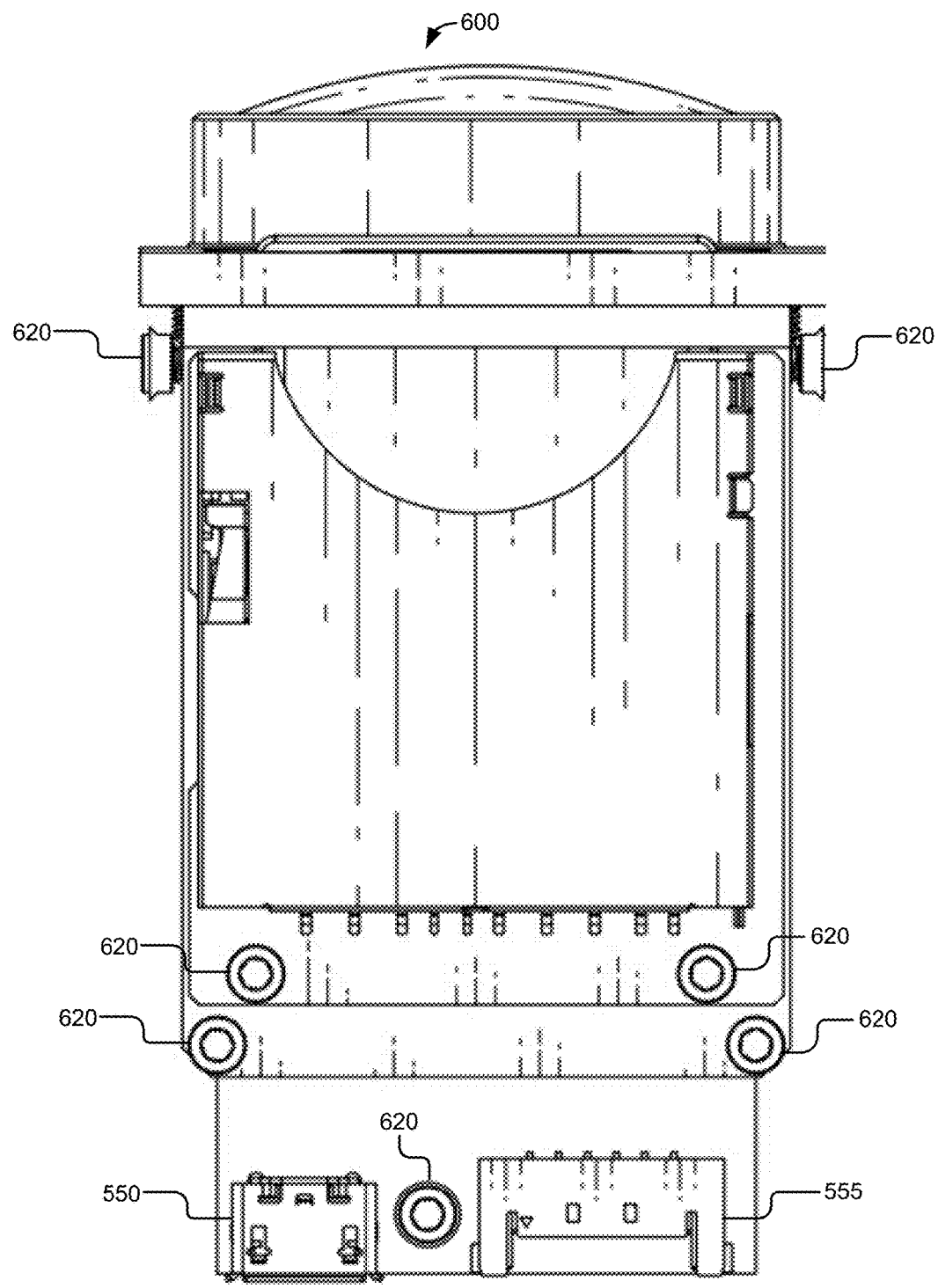
FIG. 6G illustrates a plan view of the camera body according to some embodiments.

FIG. 6G illustrates a plan view of the camera body 600 according to some embodiments. In this example, seven bolts 620 are visible as well as the top of the micro-USB connector 550 and the top of a daisy chain connector 555.

Figure 6H:
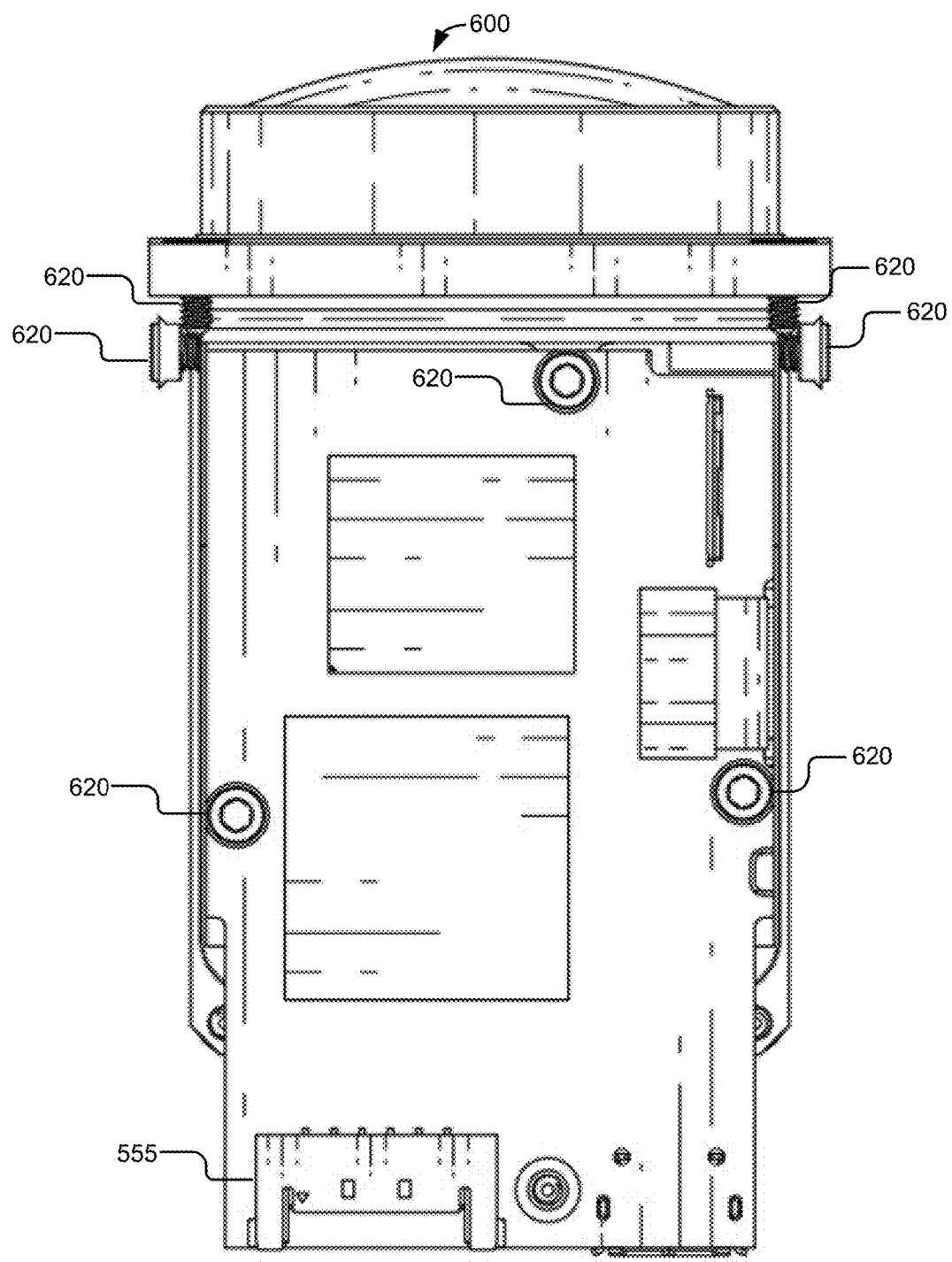
FIG. 6H illustrates a bottom view of the camera body according to some embodiments.

FIG. 6H illustrates a bottom view of the camera body 600 according to some embodiments. In this example, seven bolts 620 are visible as well as the bottom of a daisy chain connector 555.

Figure 7A:
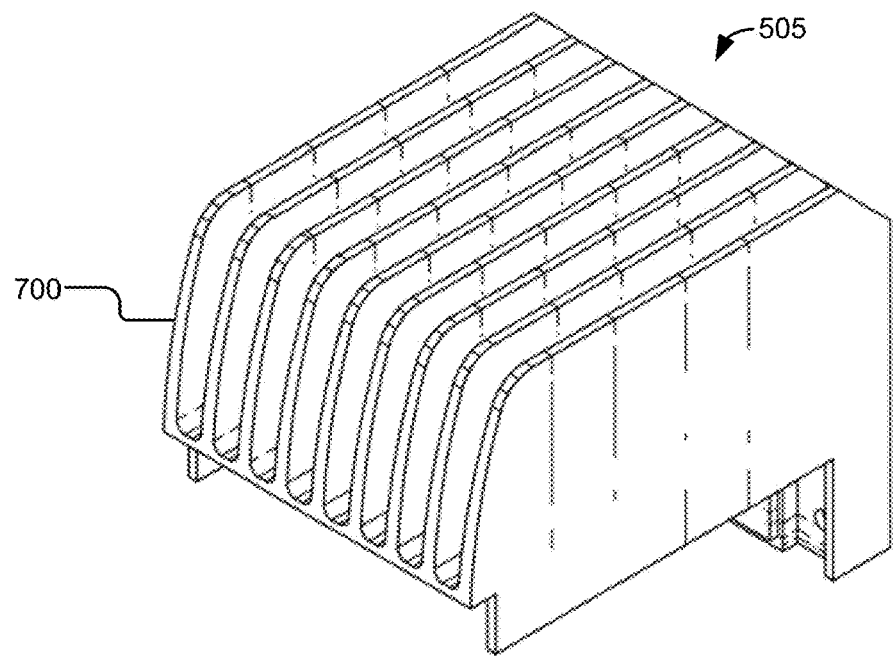
FIG. 7A illustrates an angled side elevation view of the top heat sink according to some embodiments.

FIG. 7A illustrates an angled side elevation view of the top heat sink 505 according to some embodiments. The top heat sink 505 forms fins 700 that are formed from metal. In some embodiments, the fins 700 are about 1 mm thick with a gap of 3 mm-4 mm between the fins 700.

Figure 7B:
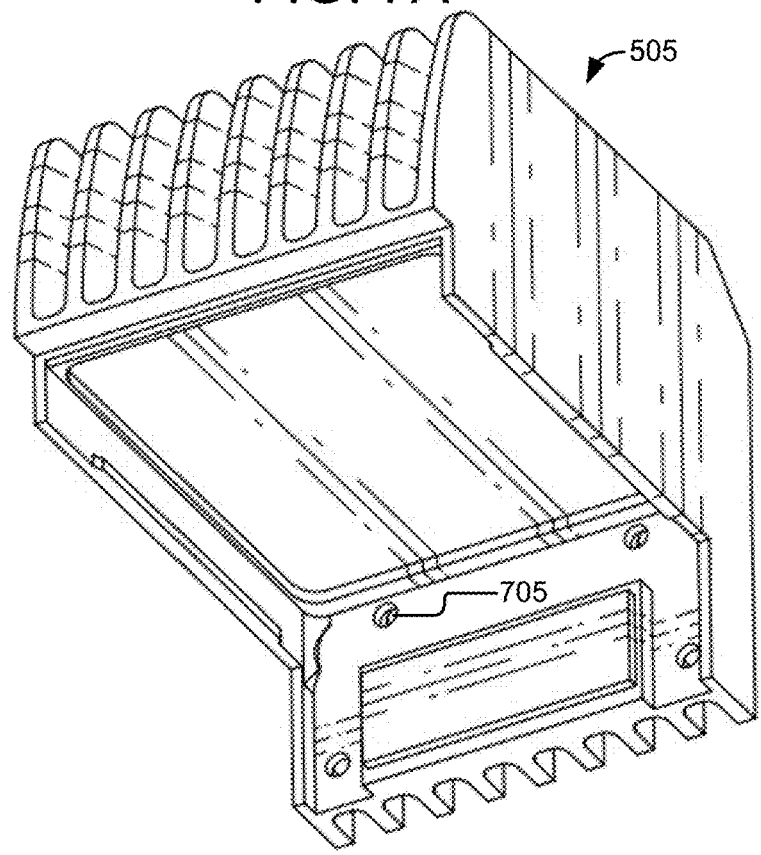
FIG. 7B illustrates another angled side view of the top heat sink according to some embodiments.

FIG. 7B illustrates another angled side view of the top heat sink 505 according to some embodiments. The top heat sink 505 forms four apertures 705. The bolts 535 illustrated in FIG. 5D may be used to attach the top heat sink 505 to the bottom heat sink 520.

Figure 7C:
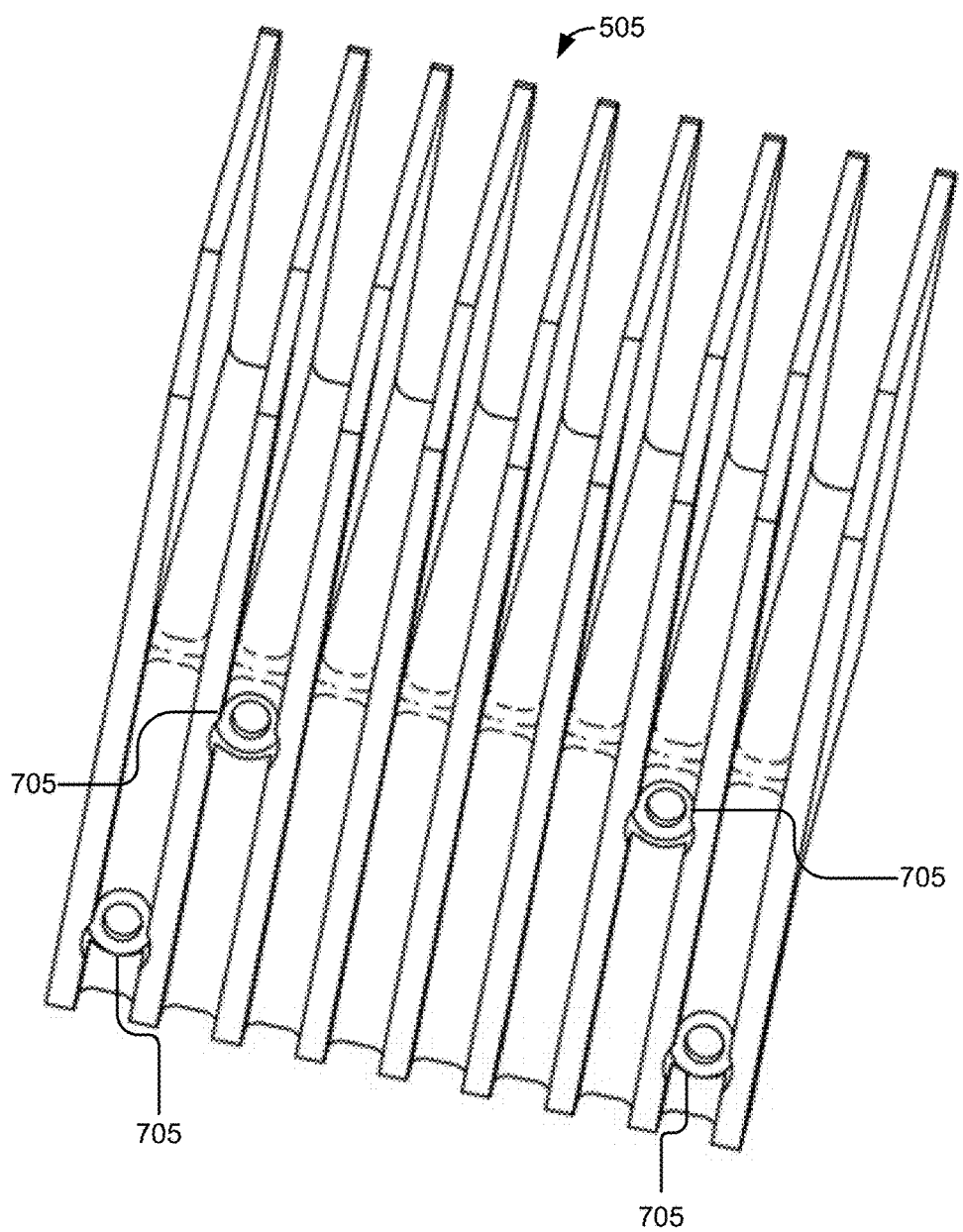
FIG. 7C illustrates another side view of the top heat sink according to some embodiments.
Figure 7D:
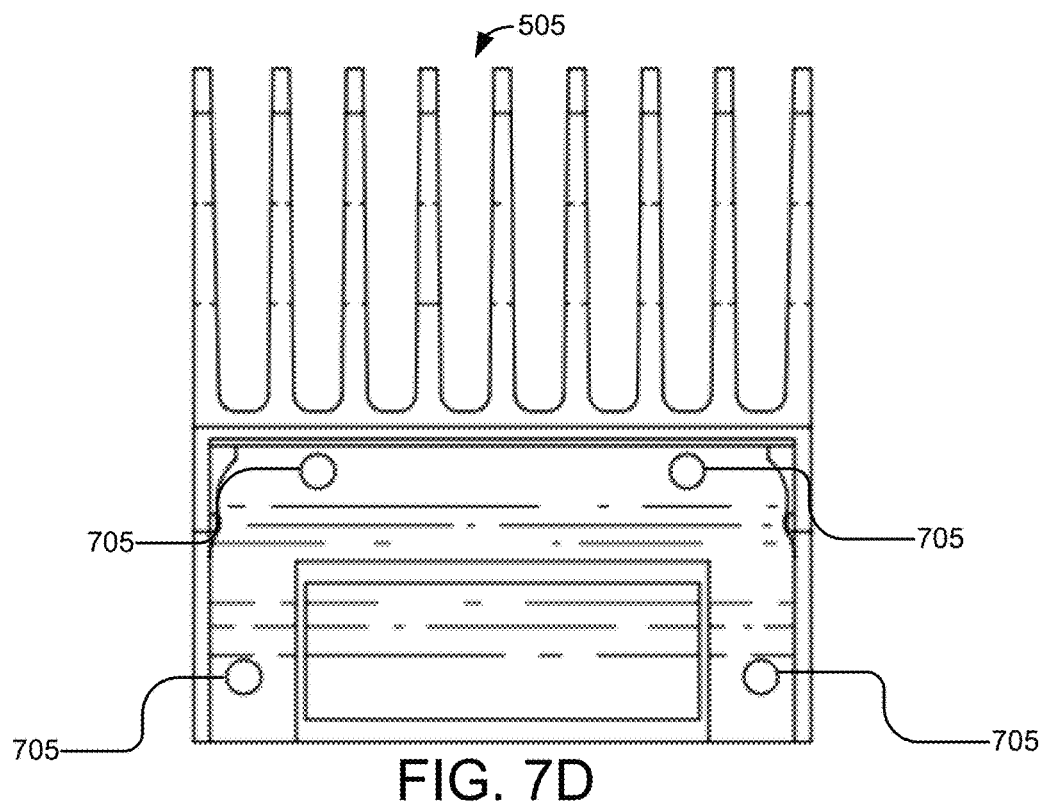
FIG. 7D illustrates a front elevation view of the top heat sink according to some embodiments.
Figure 7E:
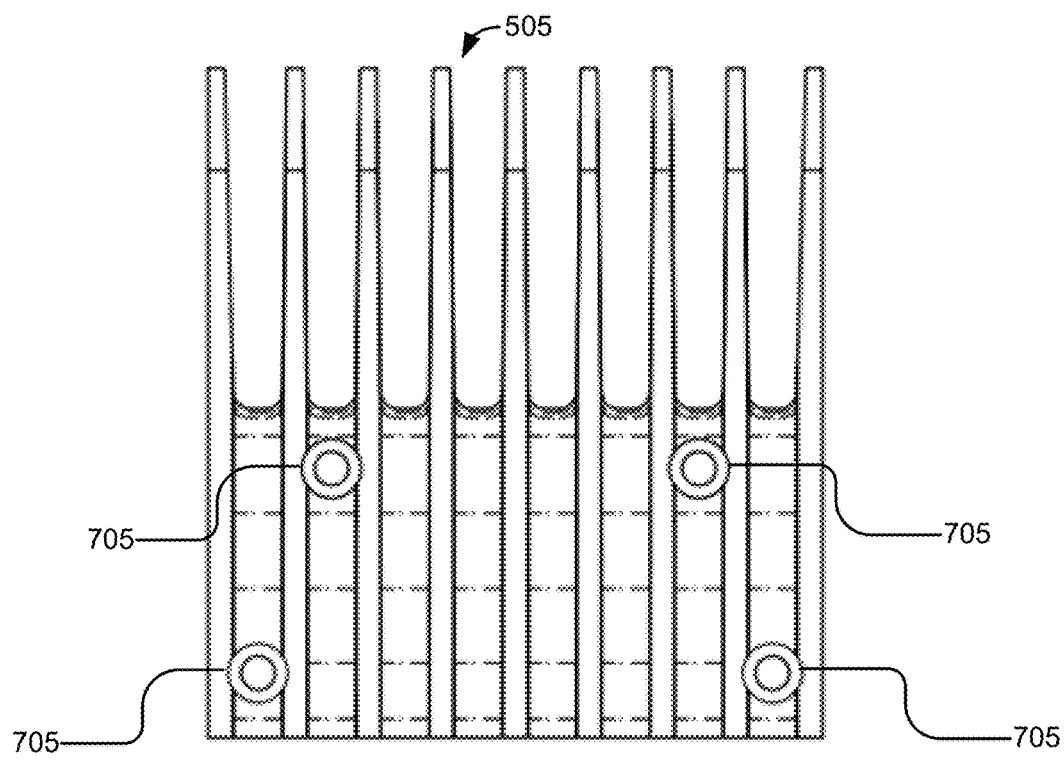
FIG. 7E illustrates a back elevation view of the top heat sink according to some embodiments.

FIG. 7C illustrates another side view of the top heat sink 505 according to some embodiments. FIG. 7D illustrates a front elevation view of the top heat sink 505 according to some embodiments. FIG. 7E illustrates a back elevation view of the top heat sink 505 according to some embodiments. In each of these examples, the four apertures 705 are visible.

Figure 7F:
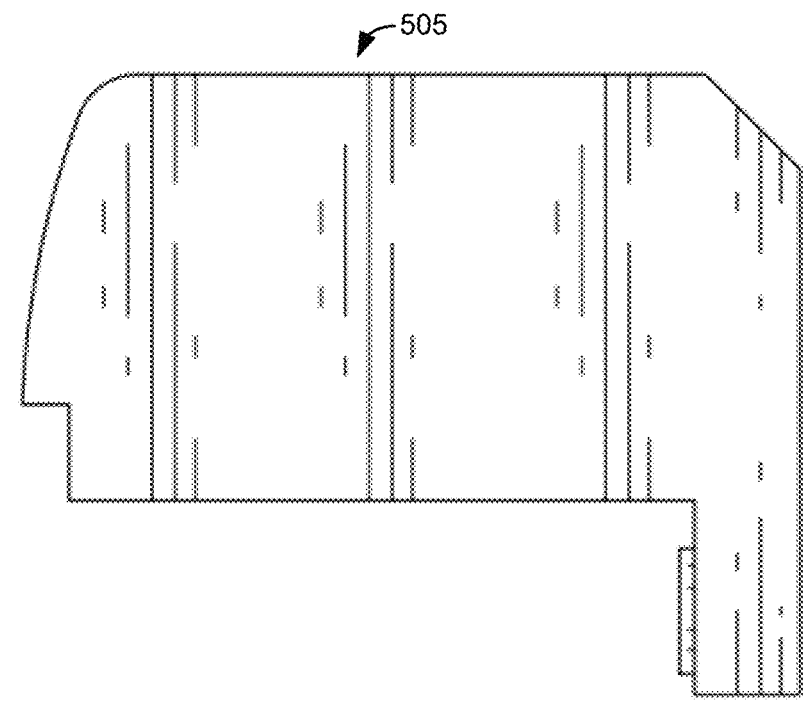
FIG. 7F illustrates a side elevation view of the top heat sink according to some embodiments.
Figure 7G:
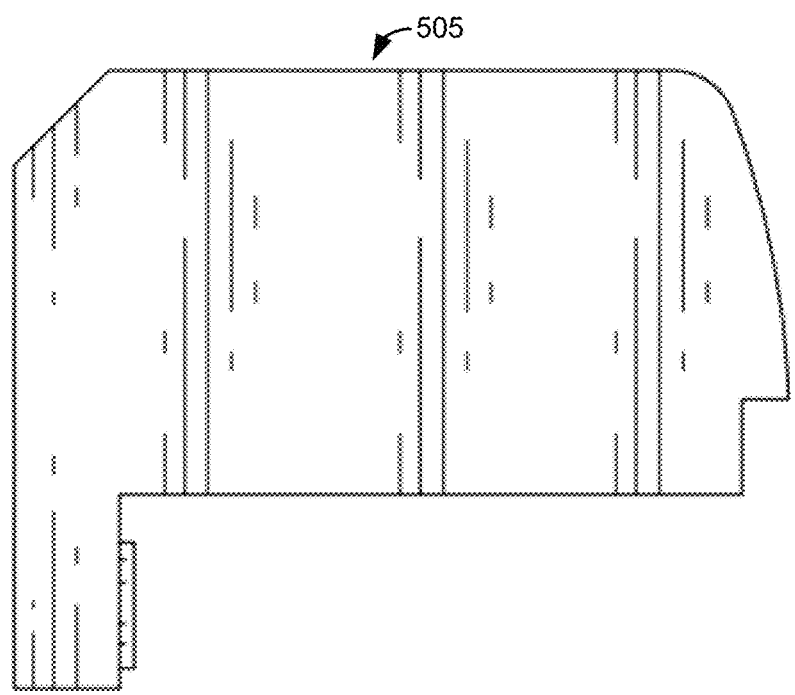
FIG. 7G illustrates another side view of the top heat sink according to some embodiments.
Figure 7H:
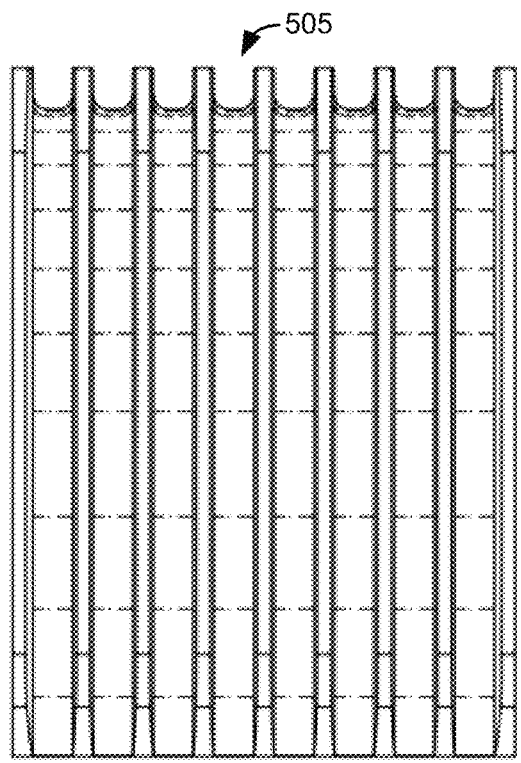
FIG. 7H illustrates a plan view of the top heat sink according to some embodiments.
Figure 7I:
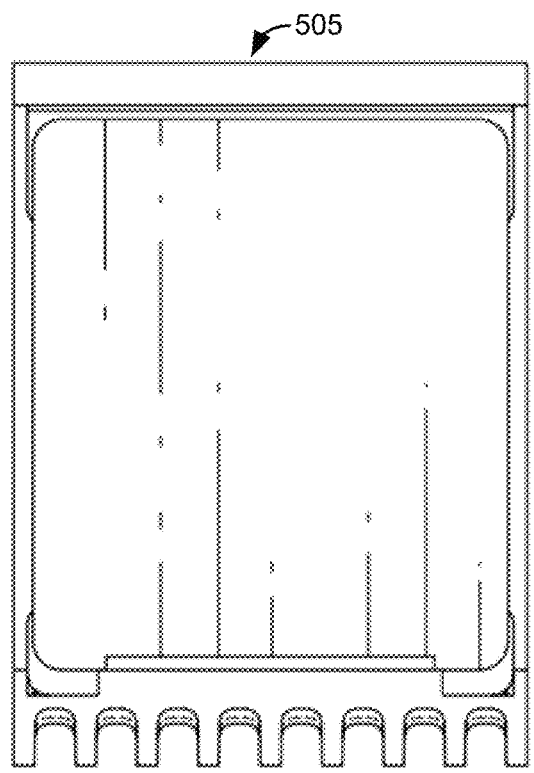
FIG. 7I illustrates a bottom view of the top heat sink according to some embodiments.

FIG. 7F illustrates a side elevation view of the top heat sink 505 according to some embodiments. FIG. 7G illustrates another side view of the top heat sink 505 according to some embodiments. FIG. 7H illustrates a plan view of the top heat sink 505 according to some embodiments. FIG. 7I illustrates a bottom view of the top heat sink 505 according to some embodiments.

Figure 8A:
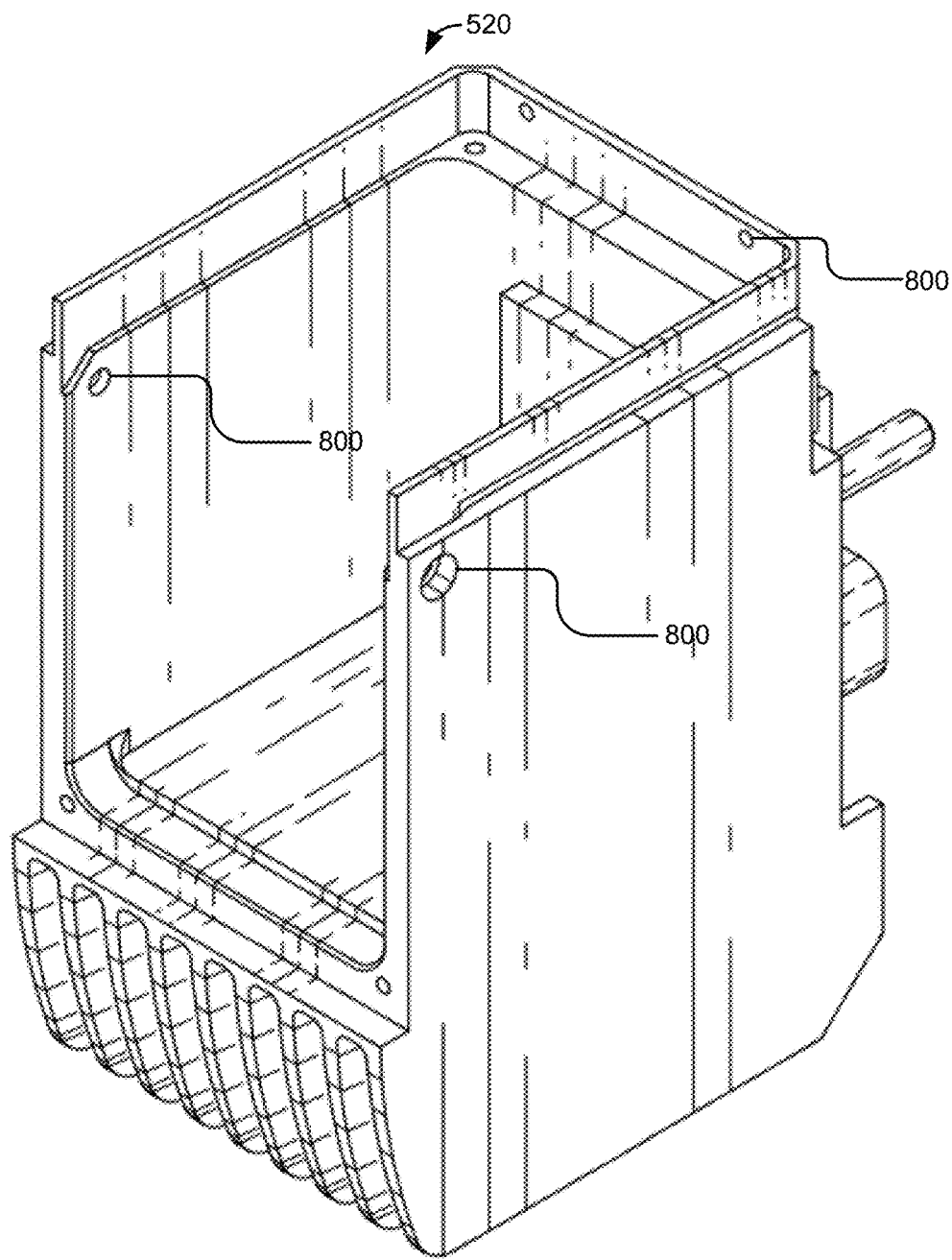
FIG. 8A illustrates an angled side elevation view of the bottom heat sink according to some embodiments.

FIG. 8A illustrates an angled side elevation view of the bottom heat sink 520 according to some embodiments. The bottom heat sink 520 is a housing that forms apertures 800 where the screws illustrated in FIGS. 5E and 5F may be used to attach the bottom heat sink 520 to the camera body 600. Although screws 565 are illustrated at this position in the figures, other devices may be used to attach the bottom heat sink 520 to the camera body 600, such as a bolt, glue, etc.

Figure 8B:
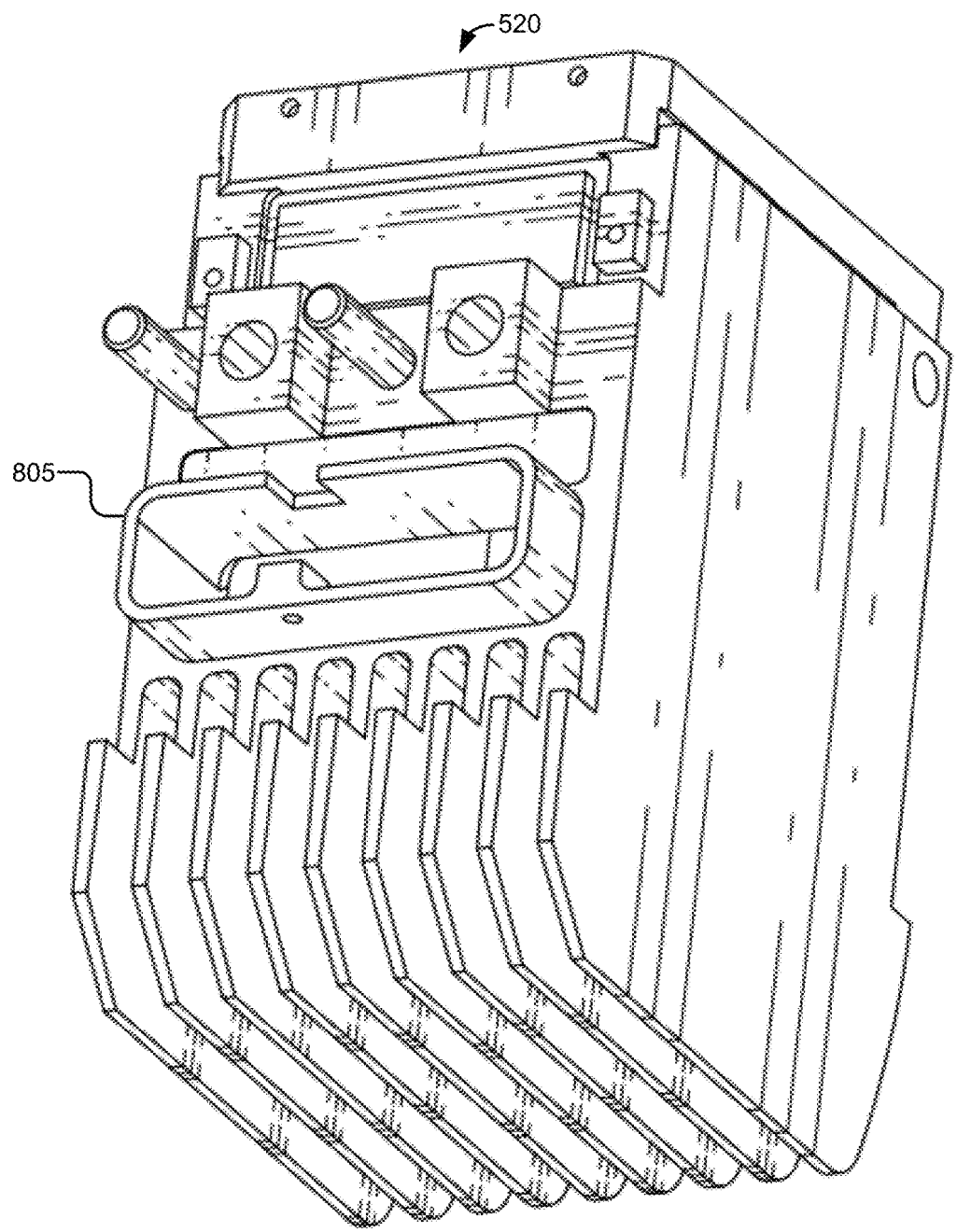
FIG. 8B illustrates another angled side elevation view of the bottom heat sink according to some embodiments.

FIG. 8B illustrates another angled side elevation view of the bottom heat sink 520 according to some embodiments. The bottom heat sink 520 includes a protective casing 805 that surrounds the micro-USB connector 550 and the two daisy chain connectors 555 that are attached to the camera body 600.

Figure 8C:
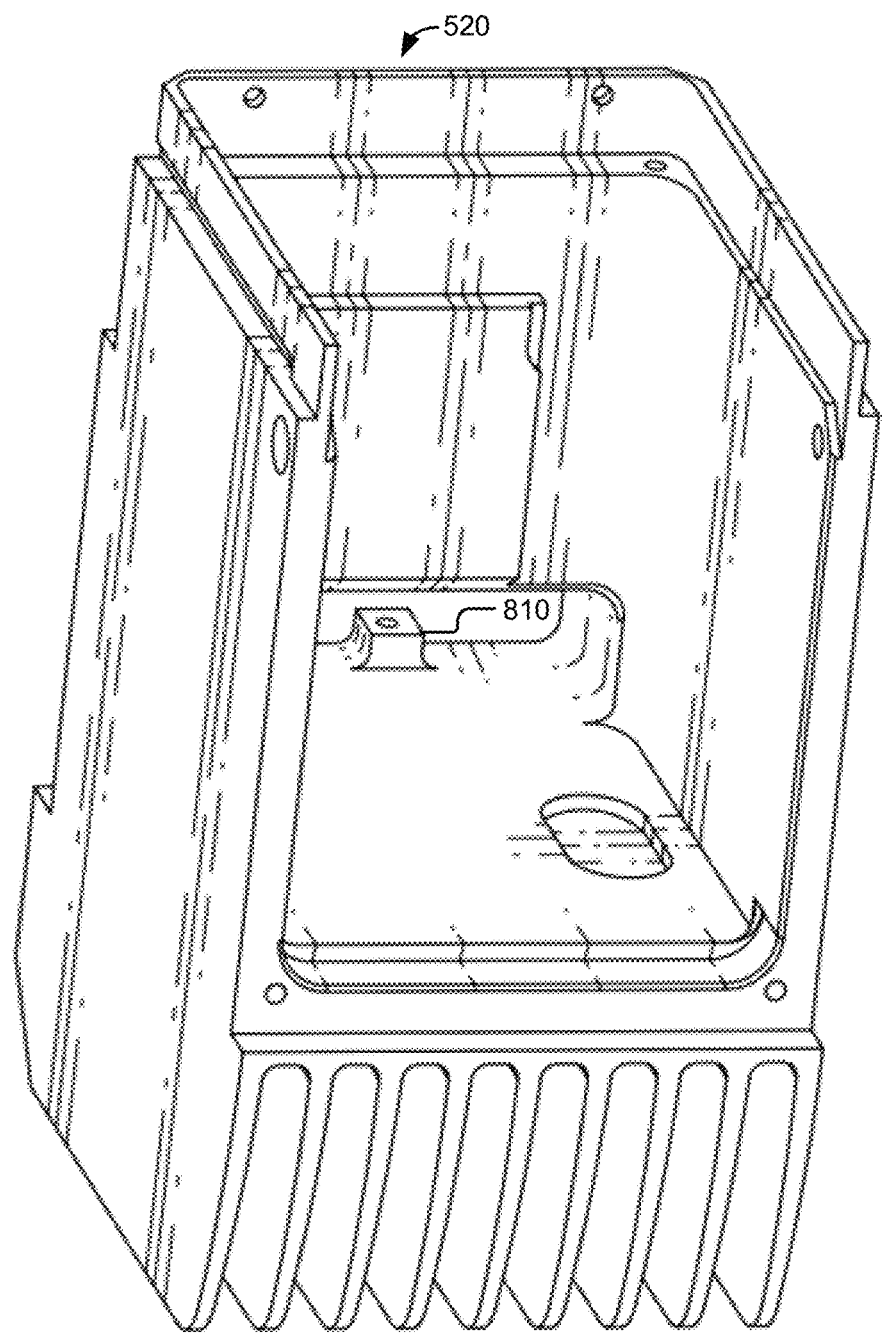
FIG. 8C illustrates another angled side elevation view of the bottom heat sink according to some embodiments.

FIG. 8C illustrates another angled side elevation view of the bottom heat sink 520 according to some embodiments. The inside of the bottom heat sink 520 includes a pedestal 810 that corresponds to the PCB 620 that is mounted to the camera body 600 to help position the camera body 600 on top of the bottom heat sink 520.

Figure 8D:
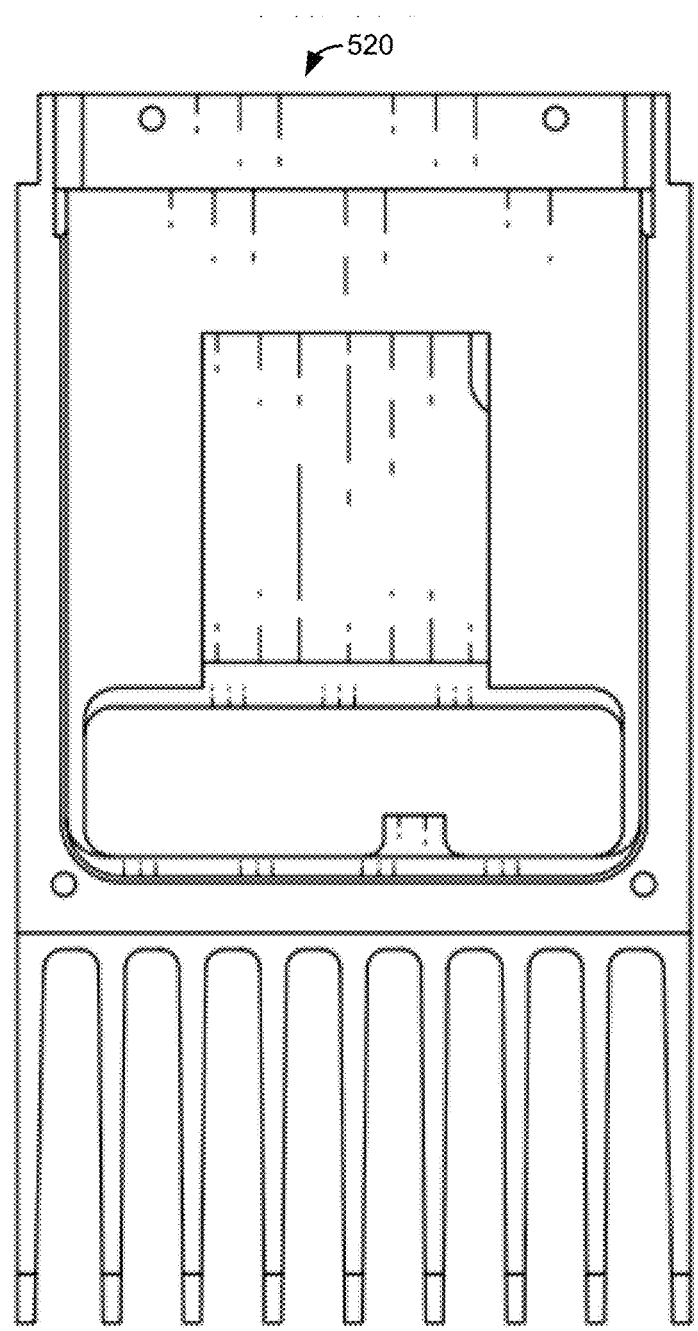
FIG. 8D illustrates a front elevation view of the bottom heat sink according to some embodiments.
Figure 8E:
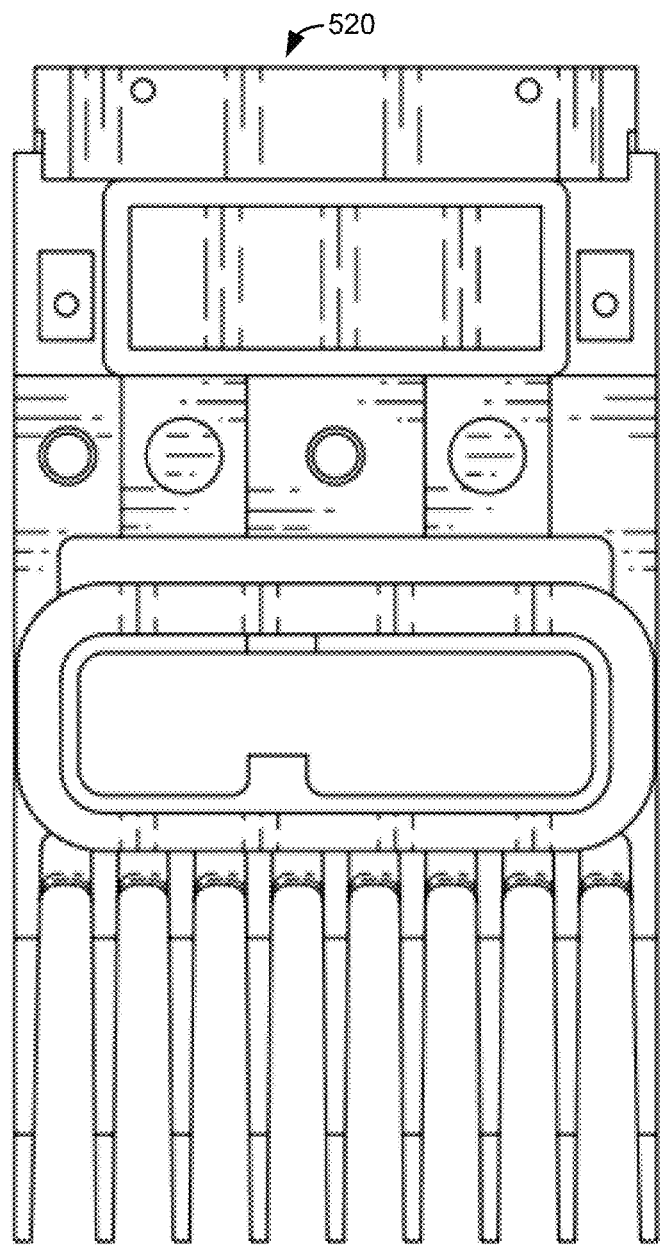
FIG. 8E illustrates a back elevation view of the bottom heat sink according to some embodiments.
Figure 8F:
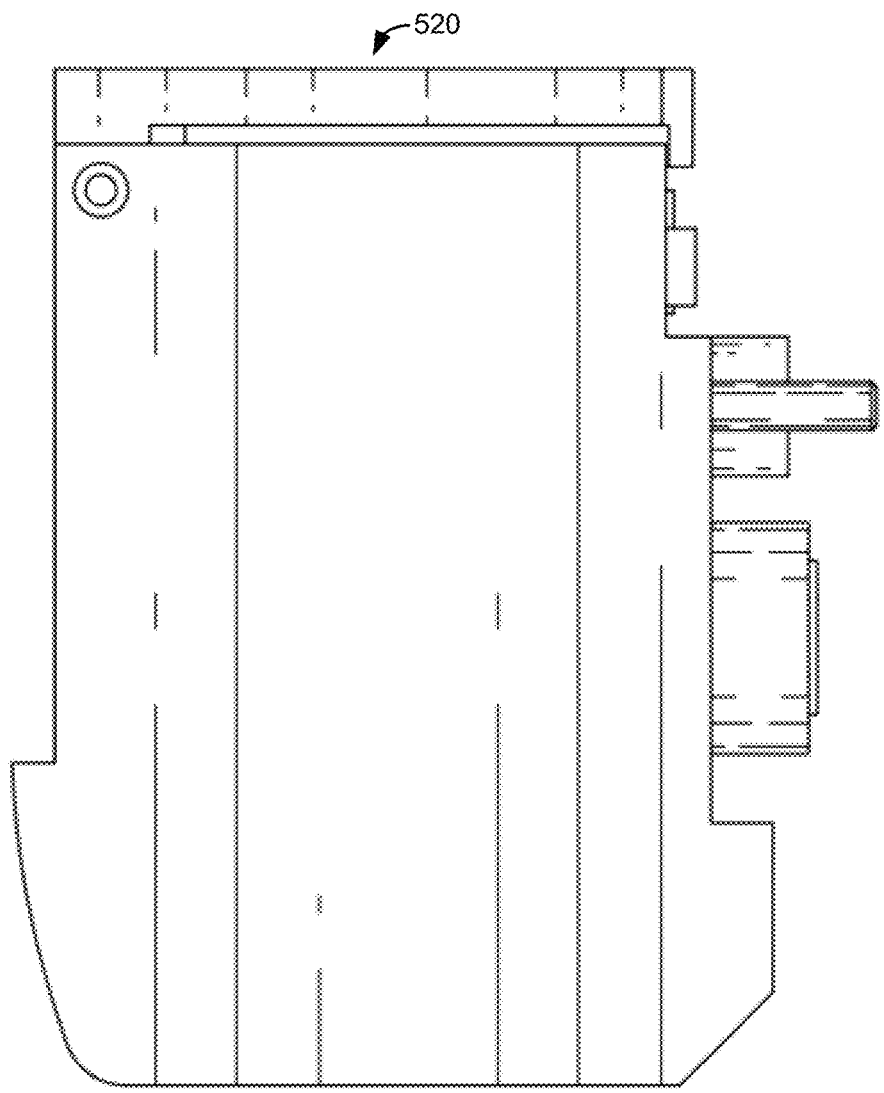
FIG. 8F illustrates a side elevation view of the bottom heat sink according to some embodiments.
Figure 8G:
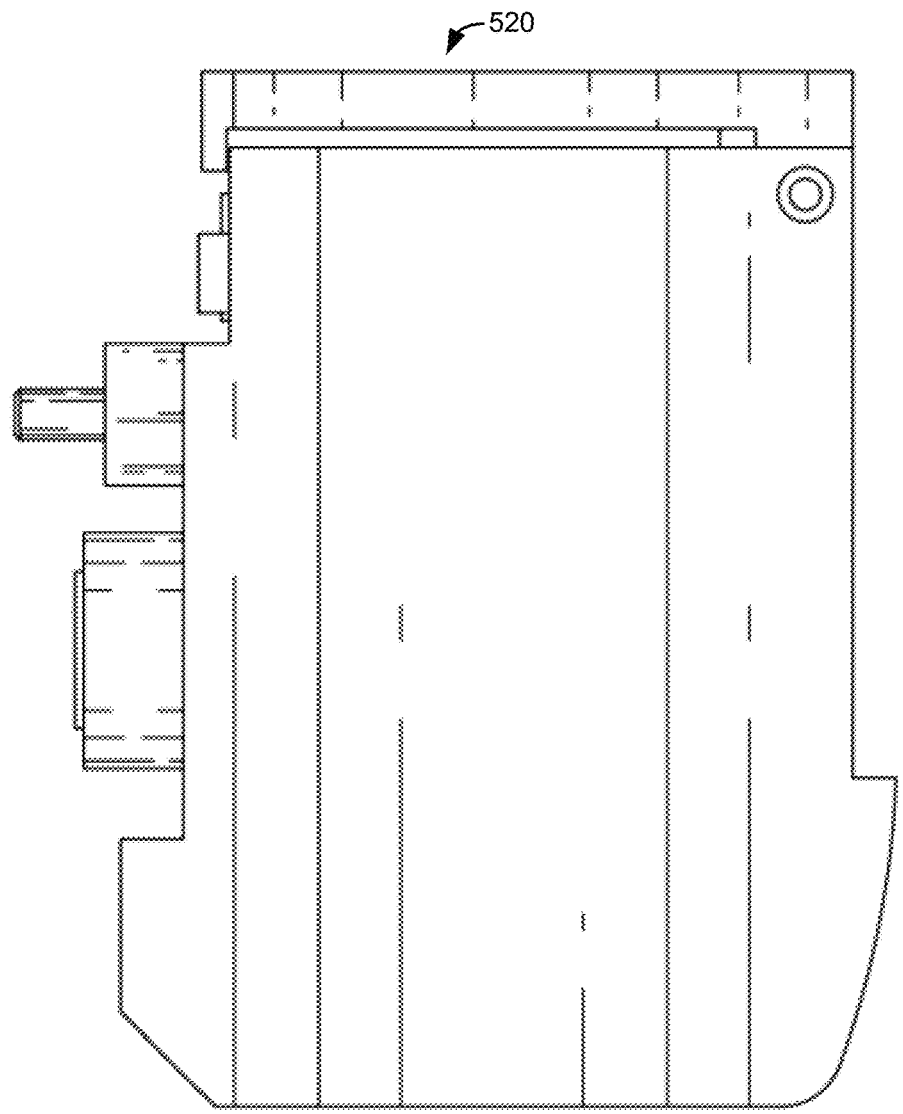
FIG. 8G illustrates another side elevation view of the bottom heat sink according to some embodiments.
Figure 8H:
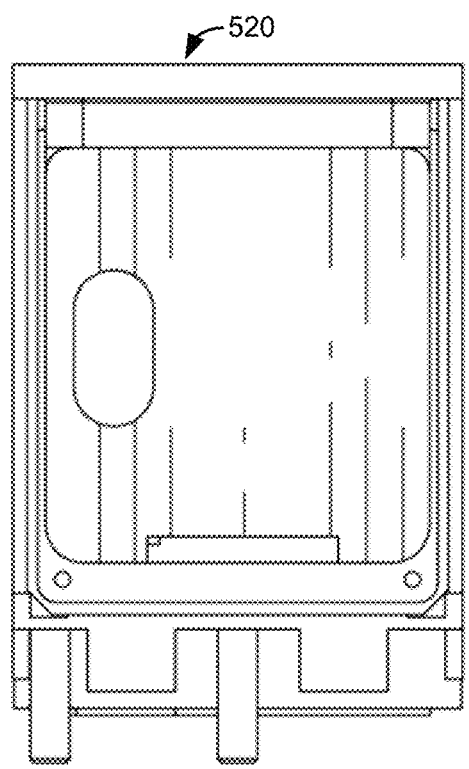
FIG. 8H illustrates a plan view of the bottom heat sink according to some embodiments.
Figure 8I:
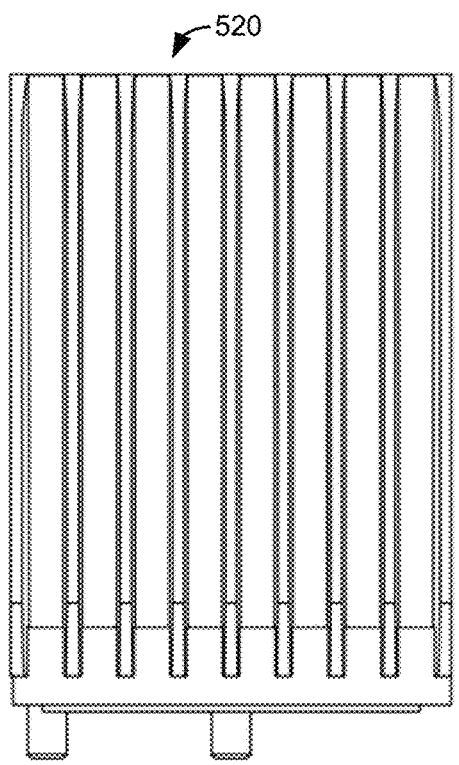
FIG. 8I illustrates a bottom view of the bottom heat sink according to some embodiments.

FIG. 8D illustrates a front elevation view of the bottom heat sink 520 according to some embodiments. FIG. 8E illustrates a back elevation view of the bottom heat sink 520 according to some embodiments. FIG. 8F illustrates a side elevation view of the bottom heat sink 520 according to some embodiments. FIG. 8G illustrates another side elevation view of the bottom heat sink 520 according to some embodiments. FIG. 8H illustrates a plan view of the bottom heat sink 520 according to some embodiments. FIG. 8I illustrates a bottom view of the bottom heat sink 520 according to some embodiments.

FIG. 9 illustrates an example virtual reality system 900 that collects and aggregates video data to generate virtual reality content according to some embodiments. The virtual reality system 900 comprises the camera array 101, a client device 905, a server 915, a viewing device 920, and a network 925.

The separation of various components and servers in the embodiments described herein should not be understood as requiring such separation in all embodiments, and it should be understood that the described components and servers may generally be integrated together in a single component or server. Additions, modifications, or omissions may be made to the illustrated embodiment without departing from the scope of the present disclosure, as will be appreciated in view of the disclosure.

While FIG. 9 illustrates one camera array 101, one client device 905, one server 915, and one viewing device 920, the disclosure applies to a system architecture having one or more camera arrays 101, one or more client devices 905, one or more servers 915, and one or more viewing devices 920. Furthermore, although FIG. 9 illustrates one network 925 coupled to the entities of the system 900, in practice one or more networks 925 may be connected to these entities and the one or more networks 925 may be of various and different types.

The camera array 101 may capture video data from each of the camera modules 120. The camera array 101 may communicate with the server 915 and/or the client device 905 by accessing the network 925 via signal line 902. Signal line 902 may represent a wireless or a wired connection. For example, the camera array 101 may wirelessly transmit video data over the network 925 to the server 915. In some embodiments, the camera array 101 may be directly connected to the client device 905. For example, as illustrated in FIG. 2A, the camera array 101 may connect to the client device 905 via the internal USB cable 215.

The network 925 may be a conventional type, wired or wireless, and may have numerous different configurations including a star configuration, token ring configuration, or other configurations. Furthermore, the network 925 may include a local area network (LAN), a wide area network (WAN) (e.g., the Internet), or other interconnected data paths across which multiple devices may communicate. In some embodiments, the network 925 may be a peer-to-peer network. The network 925 may also be coupled to or include portions of a telecommunications network for sending data in a variety of different communication protocols. In some embodiments, the network 925 may include Bluetooth™ communication networks or a cellular communication network for sending and receiving data including via short messaging service (SMS), multimedia messaging service (MMS), hypertext transfer protocol (HTTP), direct data connection, wireless access protocol (WAP), e-mail, etc.

The client device 905 may be a processor-based computing device. For example, the client device 905 may be a personal computer, laptop, tablet computing device, smartphone, set top box, network-enabled television, or any other processor based computing device. In some embodiments, the client device 905 includes network functionality and is communicatively coupled to the network 925 via a signal line 904. The client device 905 may be configured to transmit data to the server 915 or to receive data from the server 915 via the network 925. A user 910 may access the client device 905.

The client device 905 may include a virtual reality (VR) application 903a. The VR application 903a may be configured to control the camera array 101 and/or aggregate video data and raw audio data to generate a stream of 3D video data and a stream of 3D audio data, respectively. The VR application 903a may be stored on a single device or a combination of devices of FIG. 9. In some embodiments, the VR application 903a can be implemented using hardware including a field-programmable gate array ("FPGA") or an application-specific integrated circuit ("ASIC"). In some other embodiments, the VR application 903a may be implemented using a combination of hardware and software.

The VR application 903a may additionally include a set of algorithms for processing the video data captured by the camera array. The set of algorithms are stored on a non-transitory memory for converting the input across multiple camera modules into a single stream of 3D video (e.g., a single compressed stream of 3D video data). The set of algorithms may be implemented in one or more "modules." For example, the set of algorithms includes color correction algorithms for smoothing and correcting colors in the video data. In another example, the set of algorithms may be implemented in software that stitches the video data from multiple cameras into two large-format, panoramic video streams for left and right eye viewing, and encodes and compresses the video using a standard MPEG format or other suitable encoding/compression format.

The client device 905 may receive a preview of the video data from the camera array 101. For example, while the camera array 101 is recording the video content, the camera array 101 may provide the client device 905 with a view of the video content data from a particular camera module 120 or from video content that is aggregated from one or more camera modules 120. The VR application 903*a* may generate a graphical user interface configured to allow the user 910 to control the camera array 101. For example, the VR application 903*a* may allow the user 910 to change the view to a particular camera module 120, start/stop recording of video content, view aggregated video content, etc.

The client device 905 may receive video data and raw audio data from the camera array 101. In some embodiments, the client device 905 may store the video data and raw audio data locally in a storage device associated with the client device 905. Alternatively, the client device 905 may send the video data and raw audio data to the server 915 via the network 925 and may store the video data and the audio data on a storage device associated with the server 915. In some embodiments, the VR application 903*a* aggregates video data captured by the camera modules 120 to form 3D video data and aggregates raw audio data captured by the microphones in each of the camera modules 120 and/or a standalone microphone to form 3D audio data.

The server 915 may be a hardware server that includes a processor, a memory, and network communication capabilities. In the illustrated embodiment, the server 915 is coupled to the network 925 via signal line 906. The server 915 sends and receives data to and from one or more of the other entities of the system 900 via the network 925. For example, the server 915 receives VR content including a stream of 3D video data (or compressed 3D video data) and a stream of 3D audio data (or compressed 3D audio data) from the client device 905 and stores the VR content on a storage device (e.g., the database 907) associated with the server 915.

The server 915 may include a VR application 903*b* that receives video data and raw audio data from the client device 905 and/or the camera array 101 and aggregates the video data and raw audio data to generate the VR content. In some embodiments, the VR application 903*a* on the client device 905 may be configured to allow the user 910 to control the camera array 101 and the VR application 903*b* on the server 915 may be configured to generate the VR content.

The viewing device 920 may include or use a computing device to decode and render a stream of 3D video data on a virtual reality display device (e.g., Oculus Rift virtual reality display) or other suitable display devices that include, but are not limited to: augmented reality glasses; televisions, smartphones, tablets, or other devices with 3D displays and/or position tracking sensors; and display devices with a viewing position control, etc. The viewing device 920 may also decode and render a stream of 3D audio data on an audio reproduction device (e.g., a headphone or other suitable speaker devices). The viewing device 920 may include the virtual reality display configured to render the 3D video data and the audio reproduction device configured to render the 3D audio data. The viewing device 920 may be coupled to the network 925 via a signal line 908. The viewing device 920 may communicate with the client device 905 via the network 925 or via a direct connection with the client device 905 (not shown). A user 913 may interact with the viewing device 920. The user 913 may be the same or different from the user 910 that accesses the client device 905.

In some embodiments, the viewing device 920 may receive virtual reality content from the client device 905. Alternatively or additionally, the viewing device 920 may receive the virtual reality content from the server 915. The virtual reality content may include one or more of a stream of 3D video data, a stream of 3D audio data, a compressed stream of 3D video data, a compressed stream of 3D audio data, and other suitable content.

The viewing device 920 may track a head orientation of a user. For example, the viewing device 920 may include one or more accelerometers or gyroscopes used to detect a change in the user's head orientation. The viewing device 920 may decode and render the stream of 3D video data on a virtual reality display device and the stream of 3D audio data on a speaker system based on the head orientation of the user. As the user changes his or her head orientation, the viewing device 920 may adjust the rendering of the 3D video data and 3D audio data based on the changes of the user's head orientation.

The viewing device 920 may provide an immersive viewing experience to the user 913. For example, the viewing device 920 may include a virtual reality display device that has a wide field of view so that the user 913 viewing the virtual reality content feels like he or she is surrounded by the virtual reality content in a manner similar to in a real-life environment. A complete 360-degree view of the scene is provided to the user 913, and the user 913 may view the scene in any direction. As the user 913 moves his or her head, the view is modified to match what the user 913 would see as if he or she was moving his or her head in the real world. By providing a different view to each eye (e.g., a stream of left panoramic images for left eye viewing and a stream of right panoramic images for right eye viewing), which simulates what the left and right eyes may see in the real world, the viewing device 920 may give the user 913 a 3D view of the scene. Additionally, 3D surrounding sound may be provided to the user 913 based on the user's head orientation to augment the immersive 3D viewing experience. For example, if a character in an immersive movie is currently behind the user 913, the character's voice may appear to be emanating from behind the user 913.

Embodiments described herein contemplate various additions, modifications, and/or omissions to the above-described panoptic virtual presence system, which has been described by way of example only. Accordingly, the above-described camera system should not be construed as limiting. For example, the camera system described with respect to FIG. 1 below may include additional and/or different components or functionality than described above without departing from the scope of the disclosure.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware embodiments configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware embodiments or a combination of software and specific hardware embodiments are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the inventions have been described in detail, it may be understood that the various changes, substitutions, and alterations could be made hereto without departing from the spirit and scope of the invention.

What is claimed is:

1. A camera array configured to capture video content with 360 degree views of an environment, the camera array comprising: a housing comprising a first quadrant, a second quadrant, a third quadrant, and a fourth quadrant, wherein each of the first quadrant, the second quadrant, the third quadrant, and the fourth quadrant form a plurality of apertures; a chassis bottom that is removably coupled to the housing; and a plurality of camera modules that include a first set of camera modules arranged around an equator of the camera array, a second set of camera modules arranged above the equator, and a third set of camera modules arranged below the equator, wherein each camera module comprises a processor, a memory, a sensor, and a lens, wherein each of the camera modules is removably coupled to one of the plurality of apertures in the housing, wherein the first quadrant, the second quadrant, the third quadrant, and the fourth quadrant each include a subset of the plurality of camera modules.

2. The camera array of claim 1, wherein the first quadrant, the second quadrant, the third quadrant, and the fourth quadrant are each separately coupled to the chassis bottom by one or more hinges so that each of the first quadrant, the second quadrant, the third quadrant, and the fourth quadrant is operable to swing outward to provide access to the subset of the plurality of camera modules and the chassis bottom.

3. The camera array of claim 1, wherein each of the first quadrant, the second quadrant, the third quadrant, and the fourth quadrant is substantially identical to one another.

4. The camera array of claim 1, further comprising a microphone array configured to capture audio for generating sound from any arbitrary direction.

5. The camera array of claim 1, wherein the first quadrant comprises an internal universal serial bus cable that connects a connection hub of the chassis bottom to a client device so that the client device controls the camera array.

6. The camera array of claim 1, wherein the first set of camera modules includes at least 16 camera modules, the second set of camera modules includes at least four camera modules, and the third set of camera modules includes at least four camera modules.

7. The camera array of claim 1, wherein the camera array operates continuously in an environment where a temperature exceeds 25 degrees Celsius.

8. The camera array of claim 1, wherein each of the plurality of camera modules further comprises a micro-universal serial bus (USB) connector that, when connected to a USB cable, receives power from a connection hub of the chassis bottom.

9. The camera array of claim 1, wherein each of the plurality of camera modules further comprises two daisy chain connectors to connect the camera modules in a daisy chain.

10. The camera array of claim 1, wherein each of the plurality of camera modules further comprises a top heat sink and a bottom heat sink through which air passively moves.

11. The camera array of claim 1, wherein the first quadrant, the second quadrant, the third quadrant, and the fourth quadrant form a weatherproof seal when closed and apertures in the housing are at least one of plugged and gasketed.

12. A camera array configured to capture video content with 360 degree views of an environment, the camera array comprising:
a housing that forms a plurality of apertures;
a plurality of camera modules, each camera module comprising:
one or more processors;
a memory;
a sensor that receives instructions for when to start and stop recording video content;
a lens positioned to capture video content through one of the plurality of apertures;
a first heat sink positioned above the lens; and
a second heat sink positioned below the lens;
wherein the first heat sink and the second heat sink each form fins through which air passively moves.

13. The camera array of claim 12, further comprising a top that includes a handle and a record button, wherein the housing is removably attached to the top.

14. The camera array of claim 12, further comprising a chassis bottom that is removably coupled to the housing and wherein each camera module further comprises a micro-universal serial bus (USB) connector that, when connected to a USB cable, receives power from a connection hub of the chassis bottom.

15. The camera array of claim 12, wherein each camera module further comprises two daisy chain connectors to connect the plurality of camera modules in a daisy chain.

16. The camera array of claim 12, wherein each camera module is substantially identical to other camera modules in the plurality of camera modules.

17. The camera array of claim 12, wherein the housing comprises a first quadrant, a second quadrant, a third quadrant, and a fourth quadrant that each include six camera modules.

18. The camera array of claim 17, wherein the first quadrant, the second quadrant, the third quadrant, and the fourth quadrant each include a top camera module, a bottom camera module, and four equator camera modules, such that the camera array includes four top camera modules, four bottom camera modules, and sixteen equator camera modules.

19. The camera array of claim 17, wherein each of the camera modules is removable from a corresponding quadrant.

20. The camera array of claim 12, wherein the camera array operates continuously in an environment where a temperature exceeds 25 degrees Celsius.

* * * * *